US012503562B1

(12) United States Patent
Payne et al.

(10) Patent No.: US 12,503,562 B1
(45) Date of Patent: Dec. 23, 2025

(54) COMPOSITE PARTICLE AND USE THEREOF IN OPTICAL FILTRATION

(71) Applicant: Coloursmith Labs Inc., Halifax (CA)

(72) Inventors: Morrgan Bennett Payne, Halifax (CA); Raymond Neil Bennett, Halifax (CA); Gabrielle Tina Masone, Halifax (CA)

(73) Assignee: COLOURSMITH LABS INC., Halifax (CA)

(*) Notice: Subject to any disclaimer, the term of this patent is extended or adjusted under 35 U.S.C. 154(b) by 592 days.

(21) Appl. No.: 17/966,512

(22) Filed: Oct. 14, 2022

Related U.S. Application Data

(60) Provisional application No. 63/256,273, filed on Oct. 15, 2021.

(51) Int. Cl.
| | |
|---|---|
| *C08L 83/10* | (2006.01) |
| *C08J 3/12* | (2006.01) |
| *G02B 1/04* | (2006.01) |
| *G02F 1/1335* | (2006.01) |

(52) U.S. Cl.
CPC ............... *C08J 3/126* (2013.01); *C08L 83/10* (2013.01); *G02B 1/043* (2013.01); *G02F 1/133509* (2013.01); *C08J 2383/10* (2013.01)

(58) Field of Classification Search
None
See application file for complete search history.

(56) References Cited

U.S. PATENT DOCUMENTS

| | | | |
|---|---|---|---|
| 6,020,445 A | 2/2000 | Vanderlaan et al. | |
| 6,861,123 B2* | 3/2005 | Turner | B29C 33/42 526/279 |
| 8,513,325 B2* | 8/2013 | Liu | G02B 1/043 526/279 |
| 8,672,475 B2* | 3/2014 | Liu | B29D 11/00067 351/159.04 |
| 2009/0234089 A1* | 9/2009 | Ueyama | C08F 8/42 526/279 |

FOREIGN PATENT DOCUMENTS

CN 112004845 A * 11/2020 ........... C09D 151/08

OTHER PUBLICATIONS

Porphyrin AND composite particle—Google Scholar search (Year: 2025).*
Porphyrin AND copolymer—Google Scholar search (Year: 202).*

* cited by examiner

*Primary Examiner* — Peter A Salamon
(74) *Attorney, Agent, or Firm* — SMART & BIGGAR LP

(57) ABSTRACT

The present disclosure relates to composite particles comprising porphyrin dye and amphiphilic block copolymer. Further, the present disclosure relates to contact lens comprising the composite particles described herein, and uses of the contact lens and composite particles herein for optical filtration, optionally in the blue light region.

20 Claims, 8 Drawing Sheets

(A)

(B)

(A)

(B)

(A)

(B)

(C)

(D)

COMPOSITE PARTICLE AND USE THEREOF IN OPTICAL FILTRATION

RELATED APPLICATION

This disclosure claims priority and benefit of U.S. Provisional Patent Application Ser. No. 63/256,273 filed Oct. 15, 2021, incorporated herein by reference in its entireties.

FIELD

The present disclosure relates to composite particles comprising one or more dyes and one or more amphiphilic block copolymers and to compositions comprising such composite particles, and their use, for example, to selectively filter light, optionally in contact lenses, including hydrogel-based and silicone hydrogel-based contact lenses.

INTRODUCTION

Optical filters are devices having wavelength-selective transmission acting on sources or receivers of light. Such filters may be configured to transform aspects of colour appearance as seen by the human eye or any recording devices. Optical filters are useful, for example, in situations where certain wavelength(s) of light must be controlled, modulated, or attenuated, particularly in fields including but not limited to vision care, medical treatments, ophthalmic lens development, cinematography, and entertainment. For example, optical filters in ophthalmic lenses can provide eye-protection from high-energy radiation in the ultra-violet (UV), visible, and/or infrared spectra. Optical filters can also provide cosmetic benefits, such as colour balancing to improve contact lens aesthetics or colour augmentation for entertainment or to achieve a desired visual effect. Further, optical filters can serve in medical applications of ophthalmic lenses, such as altering human spectral responses associated with the short (S), medium (M), and long (L) cone cell photoreceptors for use in treating genetic and/or non-genetic vision conditions, such as colour vision deficiencies or myopia.

The need for optical filters is more pronounced in the field of blue light filtration. In recent years the effects of blue light on human eyesight and circadian rhythm have become a topic of interest in ophthalmology and public health. This is in part due to the increased use of blue light producing light emitting diodes (LEDs) as indoor light sources, and in electronic displays in computers, tablets, and cell phones. It is well documented that blue light ranging from approximately 400-500 nm can damage the eye and impact physiological function in humans. Within this range, photons of higher energy (lower wavelengths, i.e. 400-450 nm) are considered to be potentially more damaging to the eyes. Photochemical damage to the eye retina from blue light can result from either short, intense exposure, or from prolonged, less intense light exposure. The damage of the retina during these exposures can be caused by light absorption by photoreceptors, or by the generation of reactive oxygen species in the retina. Over time this retinal damage can lead to a variety of medical conditions including cataracts, dry-eye, and age-related macular degeneration. It has been shown that the application of blue light filters can reduce the amount of retinal damage in mice compared to the same light exposure without a blue light filter. This suggests that blue light filters may reduce some of the health risks associated with blue light in humans.

Currently, two different methods exist to prepare optical filtering contact lenses containing light-filtering additives such as dye(s). The first method is the incorporation of dye(s) into contact lenses by soaking hydrated or non-hydrated lenses in a bath of dye(s) and solvent. This method can result in the migration of dye molecules out of the bulk hydrogel material, loss or reduction in optical filtering ability, and potential for health concerns resulting from the release of dye(s) onto the eye.

The second method is the incorporation of dye(s) into contact lenses is to directly cure a solution of contact lens monomer containing a dye where the dye is especially functionalized to be reactive to contact lens monomer. For example, the dyes can be functionalized with a vinylsulfonyl group or a halogen triazine group. Although attempts to polymerize dye(s) with the hydrogel monomer could significantly reduce the migration of dye molecules out of the bulk hydrogel material, only a limited number of commercially available dyes have the correct local chemistries required for covalent attachment to the bulk hydrogel material. Applying this method to a non-functionalized dye would often necessitate elaborate de novo redesign and modification of dyes to have the correct local chemistries to satisfy covalent attachment within the bulk hydrogel material. Further, synthetically altering non-functionalized dye in this manner could result in the alteration of the dye's absorption spectra, rendering it unsuitable for use as an optical filter for the desired application for which it was selected.

For example, light-absorbing dye zinc(II) tetraphenylporphyrin (Zn (II) TPP) has optical properties that would make it commercially valuable as a HEV/blue light blocker in contact lenses. However, Zn (II) TPP does not have the correct local chemistries required for direct covalent attachment to the bulk hydrogel material. Synthetically modifying Zn (II) TPP to provide the correct functionalization would result in the loss, reduction, and/or alteration of its HEV/blue light blocking ability.

Depending on the particular setting where light-absorbing additives are used, different challenges arise from this method that necessitate various properties of the dyes employed.

For instance, dye(s) to be integrated into the contact lens monomer may be exposed to a number of harsh lens manufacturing processes and conditions, such as photosetting by UV/HEV light, thermosetting by the application of heat, and/or catalyst-initiated polymerization by incorporating a polymerization catalyst in the bulk contact lens monomer. Further, during use, contact lenses containing dye(s) may be exposed to damaging UV/HEV radiation from natural and/or artificial sources.

The manufacture of hydrogel-based contact lenses often uses photosetting by use of UV/HEV light could degrade the optical properties of dyes, which render many dyes non-useful for optical filtering applications in contact lenses.

Further, dyes may be exposed during lens manufacture to various organic solvent extraction, solvent washing, hydration, autoclave sterilization, and/or prolonged exposure to high or low temperatures. Solvents used during manufacture of contact lenses include ethanol and industrial methylated spirits (IMS).

Thus, there remains a need to develop technology that allows incorporation of dyes into contact lens formulations.

SUMMARY

It has been shown that the porphyrin dye 5, 10, 15, 20-(tetra-p-tolyl)porphyrin (TPTP) when formulated with, for example encapsulated in, amphiphilic block copolymer, for example poly(dimethylsiloxane)-b-poly(acrylic acid) formed stable composite particles that withstood lens manufacturing conditions including lens polymerization, solvent extraction with ethanol, and autoclaving, and provided a stable shelf life. Composite particles comprising TPTP and amphiphilic block copolymer maintained the absorption spectrum of the dye TPTP.

Accordingly, in one aspect, the present disclosure includes a composite particle comprising
5, 10, 15, 20-(tetra-p-tolyl)porphyrin (TPTP); and
an amphiphilic block copolymer encapsulating the TPTP.

In another aspect, the present disclosure includes a composition comprising one or more composite particles of the present disclosure in a solvent selected from aqueous solvent, organic solvent, and combinations thereof.

In another aspect, the present disclosure includes a contact lens monomer composition comprising
one or more composite particles of the present disclosure;
a polymerizable monomer; and
a catalyst suitable for initiating polymerization of the polymerizable monomer.

In another aspect, the present disclosure includes a contact lens comprising one or more composite particles of the present disclosure.

In another aspect, the present disclosure includes a contact lens obtained by polymerizing a contact lens monomer composition of the present disclosure.

In another aspect, the present disclosure includes a composite particle of the present disclosure for use as an optical filter.

In another aspect, the present disclosure includes a composite particle of the present disclosure for use as an optical filter to selectively block blue light.

In another aspect, the present disclosure includes a composite particle of the present disclosure for use as an optical filter to selectively block light radiation of about 410 nm to about 460 nm, about 410 nm to about 450 nm, or about 415 nm to about 455 nm.

In another aspect, the present disclosure includes a composite particle of the present disclosure for use in the preparation of a contact lens, optionally in the preparation of a hydrogel-based contact lens, or a silicone hydrogel-based contact lens.

In another aspect, the present disclosure includes use of a composite particle of the present disclosure in optical filtration.

In another aspect, the present disclosure includes use of a composite particle of the present disclosure in optical filtration to selectively block blue light.

In another aspect, the present disclosure includes use of a composite particle of the present disclosure in optical filtration to selectively block light radiation of about 410 nm to about 460 nm or about 415 nm to about 455 nm.

In another aspect, the present disclosure includes use of a composite particle of the present disclosure in the preparation of a contact lens, optionally a hydrogel-based or a silicone hydrogel-based contact lens.

In another aspect, the present disclosure includes a method of preparing a contact lens monomer composition comprising
providing a composite particle of the present disclosure; and
mixing the composite particle with a polymerisable monomer, and a catalyst suitable for initiating polymerization of the polymerisable monomer.

In another aspect, the present disclosure includes a method of preparing a contact lens comprising
preparing a contact lens monomer composition by a method of the present disclosure; and
polymerizing the contact lens monomer solution.

Other features and advantages of the present disclosure will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

The embodiments of the application will now be described in greater detail with reference to the attached drawings in which.

DESCRIPTION OF VARIOUS EMBODIMENTS

1. Definitions

Figure 1:
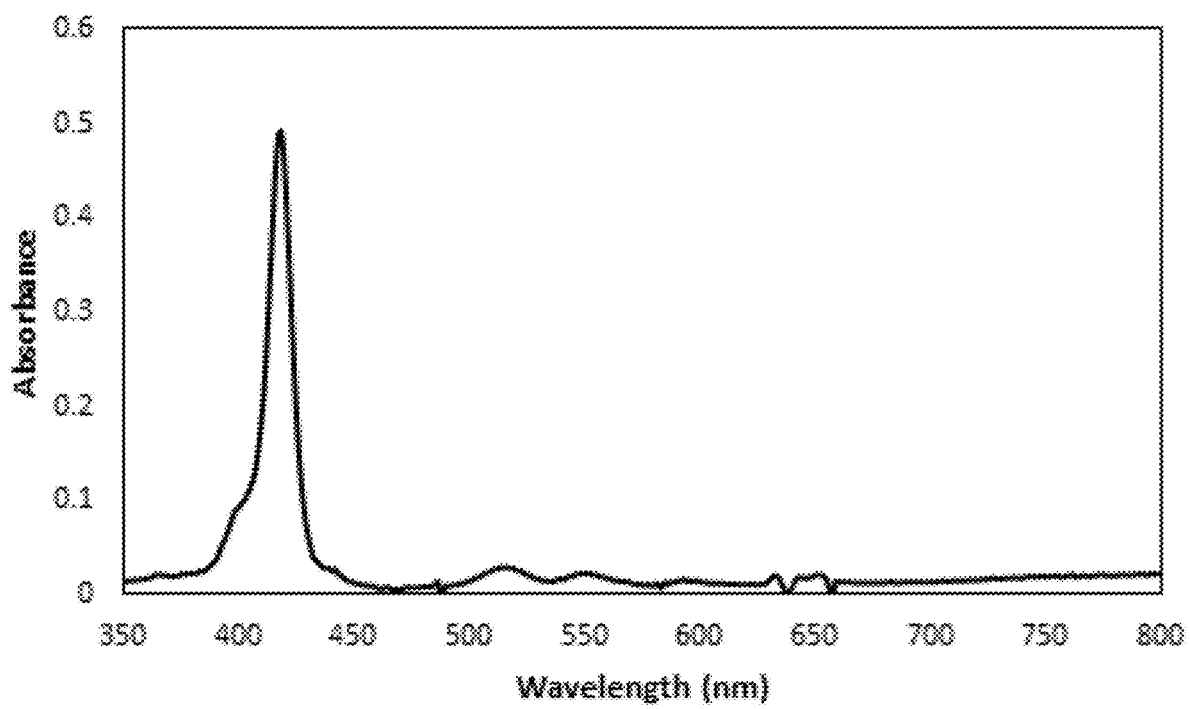
FIG. 1 shows an UV-Vis absorbance spectrum of TPTP dye in THF at a concentration of 1 µg/mL.

Unless otherwise indicated, the definitions and embodiments described in this and other sections are intended to be applicable to all embodiments and aspects of the present disclosure herein described for which they are suitable as would be understood by a person skilled in the art.

As used in the present disclosure, the singular forms "a", "an" and "the" include plural references unless the content clearly dictates otherwise.

The terms "about", "substantially" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies or unless the context suggests otherwise to a person skilled in the art.

The present description refers to a number of chemical terms and abbreviations used by those skilled in the art. Nevertheless, definitions of selected terms are provided for clarity and consistency.

The term "hydrophobic" as used herein, for example in "a hydrophobic dye", refers to the property of a molecule or portion thereof of that has low or no capacity to interact with water or other polar solvents. For example, it includes repelling or tending not to combine with, or incapable of being entirely dissolved in water. For example, when referring to a hydrophobic dye, the term hydrophobic could mean the dye is substantially insoluble in water, but can be soluble in a water-miscible organic solvent.

The term "hydrophilic" as used herein, refers to the property of a molecule or a portion thereof that is that has capacity to interact with water or other polar solvents.

The term "optionally substituted" as used herein refers to groups, structures, or molecules that are either unsubstituted or are substituted with one or more substituents.

The term "amphiphilic copolymers" as used herein refer to copolymers comprising subunits or monomers that have different hydrophobic and hydrophilic characteristics. For example, when the subunits or monomers of the same characteristic exist in blocks in the same copolymer chain, the copolymer is referred to as a block copolymer. For example, amphiphilic block copolymers comprise blocks where one or more blocks comprise one or more types of hydrophilic subunits or monomers while other block comprises one or more types of hydrophobic subunits or monomers, such that each block is substantially hydrophilic or hydrophobic. It is possible for the one or more types of hydrophilic or hydrophobic subunits or monomers to be dispersed throughout the copolymer, yet still yielding blocks that are substantially overall hydrophilic or hydrophobic.

The term "hydrogel" as used herein refers to a gel in which the swelling agent is water. In some embodiments, it refers to a gel comprising a polymeric network material that has an equilibrium water content of at least 10% w/w. A hydrogel comprising a silicone component, is referred to herein as a "silicone hydrogel".

The term "blue light" as used herein refers to the high-energy blue portion of the spectrum. For example, it can refer to the portion of the spectrum ranging from about 380 nm to 500 nm, about 400 nm to about 470 nm, about 410 nm to about 460 nm, about 415 nm to about 455 nm, or about 415 nm to about 450 nm.

The term "selectively block light" or "selectively blocking light" or the like as used herein refers to providing a transmission maximum at a selected portion of the spectrum.

II. Composite Particles, Compositions and Uses Thereof

In one aspect, the present disclosure includes a composite particle comprising 5, 10, 15, 20-(tetra-p-tolyl)porphyrin (TPTP); and an amphiphilic block copolymer encapsulating the TPTP.

In some embodiments, the amphiphilic block copolymer is biocompatible. It is envisioned that the amphiphilic block copolymer can be a diblock copolymer, triblock copolymer, or the like. For example, the amphiphilic block copolymer is a diblock copolymer. In some embodiments, the amphiphilic block copolymer is a triblock copolymer.

In some embodiments, the amphiphilic block copolymer is a poly(alkyl acrylate)-based copolymer, a poly(alkyl methacrylate)-based copolymer, a poly(acrylic acid)-based copolymer, a poly(methacrylic acid)-based copolymer, a polydiene-based copolymer, a poly(N-isopropylacrylamide)-based copolymer, a polyethylene glycol-based copolymer, a poly(methylene indane)-based copolymer, a polysiloxane-based copolymer, a polystyrene-based copolymer, a substituted polystyrene-based copolymer, a poly(vinyl pyridine)-based copolymer, a poly(vinyl alcohol) based copolymer, a poly(alkylacrylic acid)-based copolymer, a poly(alkylene oxide)-based copolymer, a poly(dialkyl siloxane)-based copolymer, a poly(olefin)-based copolymer, a poly(alkylene oxide diacrylate)-based copolymer, a poly(butanediol diacrylate)-based copolymer, or combinations thereof, in some embodiments, the amphiphilic block copolymer is a poly(alkyl acrylate)-based copolymer, a poly(alkyl methacrylate)-based copolymer, a poly(acrylic acid)-based copolymer, a poly(methacrylic acid)-based copolymer, a polydiene-based copolymer, a polyolefin-based copolymer, a polyethylene glycol-based copolymer, a polysiloxane-based copolymer, a poly(styrene)-based copolymer, a poly(vinyl alcohol) based copolymer, a poly(dialkyl siloxane)-based copolymer, or combinations thereof. In some embodiments, the amphiphilic block copolymer is a poly(methyl acrylate)-based copolymer, a poly(n-butyl acrylate)-base copolymer, a poly(methyl methacrylate)-based copolymer, a poly(tert-butyl methacrylate)-based copolymer, a poly(acrylic acid)-based copolymer, a poly(methacrylic acid)-based copolymer, a poly(1,2-butadiene)-based copolymer, a poly(1,4-butadiene)-based copolymer, a poly(styrene)-based copolymer, a poly(dimethyl siloxane)-based copolymer, a poly(vinyl alcohol) based copolymer, a poly(propylene oxide)-based copolymer, or combinations thereof.

It is contemplated that the amphiphilic block copolymer can be a copolymer comprising any combinations of the herein mentioned polymer blocks.

In some embodiments, the amphiphilic block copolymer is selected from poly(1,2-butadiene)-b-poly(acrylic acid), poly(1,2-butadiene)-b-poly(ethylene oxide), poly(1,2-butadiene)-b-poly(methacrylic acid), poly(1,2-butadiene)-b-poly(methyl methacrylate), poly(1,2-butadiene)-b-poly(vinyl alcohol), poly(1,2-butadiene-co-1,4-butadiene)-b-poly(acrylic acid), poly(1,2-butadiene-co-1,4-butadiene)-b-poly(ethylene oxide), poly(1,2-butadiene-co-1,4-butadiene)-b-poly(methacrylic acid), poly(1,2-butadiene-co-1,4-butadiene)-b-poly(vinyl alcohol), poly(1,4-butadiene)-b-poly(acrylic acid), poly(1,4-butadiene)-b-poly(ethylene oxide), poly(1,4-butadiene)-b-poly(methacrylic acid), poly(1,4-butadiene)-b-poly(vinyl alcohol), poly(dimethylsiloxane)-b-poly(acrylic acid), poly(dimethylsiloxane)-b-poly(ethylene oxide), poly(dimethylsiloxane)-b-poly(methacrylic acid), poly(dimethylsiloxane)-b-poly(n-butyl acrylate), poly(ethylene oxide)-b-poly(butadiene), poly(ethylene oxide)-b-poly(dimethylsiloxane), poly(ethylene oxide)-b-poly(methyl methacrylate), poly(ethylene oxide)-b-poly(n-butyl acrylate), poly(ethylene oxide)-b-poly(styrene), poly(ethylene oxide)-b-poly(tert-butyl methacrylate), poly(methyl methacrylate)-b-poly(acrylic acid), poly(methyl methacrylate)-b-poly(dimethylsiloxane), poly(methyl methacrylate)-b-poly(ethylene oxide), poly(methyl methacrylate)-b-poly(methacrylic acid), poly(methyl methacrylate)-b-poly(styrene), poly(n-butyl acrylate)-b-poly(acrylic acid), poly(propylene oxide)-b-poly(butadiene), poly(propylene oxide)-b-poly(dimethylsiloxane), poly(propylene oxide)-b-poly(methyl methacrylate), poly(propylene oxide)-b-poly(n-butyl acrylate), poly(propylene oxide)-b-poly(styrene), poly(propylene oxide)-b-poly(tert-butyl methacrylate), poly(vinyl alcohol)-b-poly(butadiene), poly(vinyl alcohol)-b-poly(dimethylsiloxane), poly(vinyl alcohol)-b-poly(methyl methacrylate), poly(vinyl alcohol)-b-poly(n-butyl acrylate), poly(vinyl alcohol)-b-poly(styrene), poly(vinyl alcohol)-b-poly(tert-butyl methacrylate), and combinations thereof. In some embodiments, the amphiphilic block copolymer is selected from poly(1,2-butadiene)$_{15000}$-b-poly(acrylic acid)$_{6500}$, poly(1,4-butadiene)$_{9000}$-b-poly(acrylic acid)$_{3500}$, poly(dimethylsiloxane)$_{5000}$-b-poly(ethylene oxide)$_{2100}$, poly(dimethylsiloxane)$_{8000}$-b-poly(acrylic acid)$_{8000}$, poly(methyl methacrylate)$_{3000}$-b-poly(ethylene oxide)$_{3000}$, poly(methyl methacrylate)$_{7400}$-b-poly(acrylic acid)$_{24300}$, poly(n-butyl acrylate)$_{7500}$-b-poly(acrylic acid)$_{5500}$, poly(styrene)$_{1300}$-b-poly(ethylene oxide)$_{5600}$, poly(vinyl alcohol)$_{2300}$-b-poly(methyl methacrylate)$_{25000}$, poly(vinyl alcohol)$_{2500}$-b-poly(styrene)$_{12500}$, and combinations thereof.

In some embodiments, the amphiphilic block copolymer is terminally functionalized, optionally, the amphiphilic block copolymer is acrylate-terminated, alkylacrylate-terminated, methacrylate-terminated, alkyl methacrylate-terminated, methylacrylamide-terminated, or combinations thereof.

In some embodiments, wherein the number average molecular weight ($M_n$) of each block of the amphiphilic block copolymer is independently from about 250 to about 100000, from about 1300 to about 31500, or from 5000 to about 10000.

In some embodiments, the ratio of the $M_n$ of a hydrophobic block to the $M_n$ of a hydrophilic block of the amphiphilic block copolymer is about 0.02 to about 128, about 0.05 to about 20, about 0.23 to about 10.9, about 0.33 to about 3, about 0.02 to about 0.50, about 0.5 to about 1, about 1 to about 5, about 5 to about 20, about 20 to about 50, or from about 50 to about 128.

In some embodiments, the amphiphilic block copolymer is poly(dimethylsiloxane)-b-poly(acrylic acid). For example, the amphiphilic block copolymer is poly(dimethylsiloxane)$_{8000}$-b-poly(acrylic acid)$_{8000}$.

In some embodiments, the composite particle has a diameter in the nanometer to micrometer range. In some embodiments, the diameter of the composite particle is from about 30 to about 300 nanometers. In some embodiments, the diameter of the composite particle is from about 50 nm to about 300 nm. In some embodiments, the diameter of the composite particle is from about 100 nm to about 275 nm, about 125 nm to about 250 nm, about 150 nm to about 250 nm, or about 150 nm to about 200 nm. In some embodiments, the diameter of the composite particle is about 150 nm to about 200 nm.

In some embodiments, the amphiphilic block copolymer encapsulates the dye in a micelle formation.

In some embodiments, the composite particle is substantially solvent-free.

In some embodiments, the composite particle comprises about 0.01% w/w to about 90% w/w of TPTP. In some embodiments, the composite particle comprises about 0.1% w/w to about 50% w/w of TPTP. In some embodiments, the composite particle comprises about 0.5% w/w to about 25% w/w of TPTP. In some embodiments, the composite particle comprises about 2% w/w to about 15% w/w of TPTP. In some embodiments, the composite particle comprises about 4% w/w to about 15% w/w of TPTP, about 7% w/w to about 13% w/w of TPTP, or about 10% w/w of TPTP.

In some embodiments, the composite particle of the present disclosure comprises TPTP; and poly(dimethylsiloxane)$_{8000}$-b-poly(acrylic acid)$_{8000}$. In some embodiments, the composite particle of the present disclosure comprises about 7% w/w to about 13% w/w of TPTP; and about 87% w/w to about 93% w/w poly(dimethylsiloxane)$_{8000}$-b-poly(acrylic acid)$_{8000}$. In some embodiments, the composite particle of the present disclosure comprises about 10% w/w of TPTP; and about 90% w/w poly(dimethylsiloxane)$_{8000}$-b-poly(acrylic acid)$_{8000}$.

In another aspect, the present disclosure includes a composition comprising one or more composite particles of the present disclosure in a solvent selected from aqueous solvent, organic solvent, and combinations thereof.

In some embodiments, the solvent is an organic solvent, optionally THF.

In some embodiments, the composition of the present disclosure further comprises polyethylene glycol.

In another aspect, the present disclosure includes a contact lens monomer composition comprising
  one or more composite particles of the present disclosure;
  a polymerizable monomer; and
  a catalyst suitable for initiating polymerization of the polymerizable monomer.

In some embodiments, the polymerizable monomer comprises methacrylate-based monomer and/or silicon-based monomer. Suitable silicon-based monomer includes at least one silicon-containing component. For example, silicone-containing component can be a silicon-containing macromer. In some embodiments, silicon-containing macromer can be monomethacryloxypropyl terminated polydimethylsiloxane (mPDMS). For example, silicon-containing macromer can be 2-[3-(9-butyl-1,1,3,3,5,5,7,7,9,9-decamethylpentasiloxanyl)propoxy]ethyl methacrylate or α,ω-Bis(methacryloxypropyl)-poly(dimethylsiloxane)-poly(co-methoxy-poly(ethylenegylcol)propylmethylsiloxane). In some embodiments, silicone-containing component can also be silicon-containing monomer such as 3-[tris(trimethylsiloxy)silyl]propyl methacrylate (TRIS), Trimethylsilylethyl vinyl carbonate, Tris(trimethylsiloxysilyl)propylvinyl carbamate (TPVC), 3-bis(trimethylsilyloxy) methylsilylpropyl glycerol methacrylate (SiMA), Methacryloxypropylbis(trimethylsiloxy) methylsilane, (3-methacryloxy-2-hydroxypropoxy)propylbis(trimethylsiloxy)methylsilane (SiGMA), 3-methacryloxypropyl pentamethyl disiloxane, 1-methoxy-2-methyl-1-(trimethylsiloxy)propene, or 2-(Trimethylsilyloxy)ethyl methacrylate. Other suitable silicon-based monomers are described in for example U.S. Pat. No. 8,672,475 B2, U.S. Pat. No. 8,513,325 B2, U.S. Pat. No. 6,861,123 B2, U.S. Pat. No. 6,020,445, US20090234089, which are incorporated herein by reference.

In some embodiments, the polymerizable monomer further comprises one or more functional monomers, such as hydrophilic monomers. Examples of the one or more functional monomers include but are not limited to acrylic acid (AA), vinyl phenol, N,N-Dimethylacrylamide(DMA), N-vinyl-pyrrolidone (NVP), Methacrylic acid, Polyethyleneglycol monomethacrylate, 2-hydroxyethyl methacrylamide, 2-hydroxyethyl methacrylate (HEMA), 2-hydroxyethyl acrylate, glycerol methacrylate, 4,4-dimethyl-2-vinyloxazol-5(4H)-one, N-vinyl-N-methyl acetamide (VMA), 1,4-butanediol vinyl ether (BVE), ethylene glycol vinyl ether (EGVE), diethylene glycol vinyl ether (DEGVE), 2-hydroxylbutyl methacrylate (HOB), and ethylene glycol methyl ether methacrylate (EGMA).

In some embodiments, the contact lens monomer composition further comprises a cross-linking agent. In some embodiments, the cross-linking agent is selected from ethylene glycol dimethacrylate (EGDMA), polyethylene glycol dimethacrylate (PEGDMA) (such as PEG200DMA, where 200 is the molecular weight of the PEG/PEO polymer chain), tetraethylene glycol dimethacrylate (TEGDMA), tri (ethylene glycol) divinyl ether (TEGDVE), Triallyl isocyanurate (TAIC), vinyl methacrylate (VM), pentaerythritol triacrylate (PTA), trimethylolpropane trimethacrylate (TPTMA), trimethylene glycol dimethacrylate (TMGDMA), and combinations thereof.

In some embodiments, the contact lens monomer composition further comprises an initiator. In some embodiments, the initiator is selected from a photoinitiator and a thermal free radical initiator. For example, the photoinitiator can be selected from 2-hydroxy-2-methylpropiophenone (Darocur 1173™), 2-hydroxy-4-(octyloxy)benzophenone, 2-hydroxy-4-(2 hydroxy-3-methacrylyloxy)propoxybenzophenone, and combinations thereof. For example, the thermal free radical initiator can be selected from 2,2'-azobis (2-methylpropionitrile) (AIBN), and 2,2'-azobis(2,4-dimethylvaleronitrile) (ADVN).

In some embodiments, the contact lens monomer composition further comprises a diluent. In some embodiments, the diluent is selected from hexanol, ethoxyethanol, isopropanol, propanol, decanol, and combinations thereof.

In some embodiments, the contact lens monomer composition further comprises one or more agents selected from UV absorber agents, tinting agents, diluent, pigments, release agents, antimicrobial agents, and combinations thereof. In some embodiments, the tinting agents are selected from 7,16-dichloro-6,15-dihydroanthrazine-5,9,14, 18-tetrone (VAT Blue 6), 1-amino-4-3-(beta-sulfatoethylsulfonyl)anilio-2-an thraquinonesulfonic acid (C. I. Reactive Blue 19, RB-19), 1,4-bis[4-(2-methacryl-oxyethyl)phenylamino]anthraquinone (Reactive Blue 246, RB-246), 1,4-bis(2-hydroxyethyl)aminol-9,10-anthracenedione bis(2-propenoic)ester (RB-247), phthalocyanine blue, phthalocyanine green, and combinations thereof.

In some embodiments, the catalyst is a free radical initiator, optionally the catalyst is AIBN.

In some embodiments, the contact lens monomer composition of the present disclosure comprises about 1% w/w to about 15% w/w, about 1% w/w to about 10% w/w, about 1% w/w to about 5% w/w, or about 3% w/w of the catalyst.

In some embodiments, the contact lens monomer composition of the present disclosure comprises about 0.05% w/w to about 10% w/w, about 0.05% w/w to about 5% w/w, about 0.05% w/w to about 2% w/w, about 0.05% w/w to about 1% w/w, about 0.05% w/w to about 0.5% w/w, about 0.1% w/w to about 0.5% w/w, about 0.1% w/w to about 0.3% w/w, or about 0.16% w/w of the one or more composite particles of the present disclosure.

In another aspect, the present disclosure includes a contact lens comprising one or more composite particles of the present disclosure.

In another aspect, the present disclosure includes a contact lens obtained by polymerizing a contact lens monomer composition of the present disclosure.

In some embodiments, the contact lens of the present disclosure is substantially stable to incubation in ethanol.

For example, the contact lens of the present disclosure retains at least about 80%, at least about 85%, at least about 90%, at least about 95% or at least about 99% of the TPTP after incubation in ethanol.

In some embodiments, the contact lens of the present disclosure has a change in an absorbance peak maximum subsequent to an ethanol extraction of less than about 30 nm, less than about 25 nm, less than about 20 nm, or less than about 15 nm.

In some embodiments, the contact lens of the present disclosure has a change in an in-band transmission subsequent to an ethanol extraction of less than about 20%, less than about 15%, less than about 13%, or less than about 11%.

In some embodiments, the contact lens of the present disclosure has a change in an out-of-band transmission subsequent to an ethanol extraction of less than about 30%, less than about 25%, less than about 20%, or less than about 17%.

In another aspect, the present disclosure includes a composite particle of the present disclosure for use as an optical filter.

In another aspect, the present disclosure includes a composite particle of the present disclosure for use as an optical filter to selectively block blue light.

In another aspect, the present disclosure includes a composite particle of the present disclosure for use as an optical filter to selectively block light radiation of about 410 nm to about 460 nm, or about 415 nm to about 455 nm.

In another aspect, the present disclosure includes a composite particle of the present disclosure for use in the preparation of a contact lens, optionally in the preparation of a hydrogel-based contact lens, or a silicone hydrogel-based contact lens.

In another aspect, the present disclosure includes use of a composite particle of the present disclosure in optical filtration.

In another aspect, the present disclosure includes use of a composite particle of the present disclosure in optical filtration to selectively block blue light.

In another aspect, the present disclosure includes use of a composite particle of the present disclosure in optical filtration to selectively block light radiation of about 410 nm to about 460 nm or about 415 nm to about 455 nm.

In another aspect, the present disclosure includes use of a composite particle of the present disclosure in the preparation of a contact lens, optionally a hydrogel-based or a silicone hydrogel-based contact lens.

In some embodiments, the composite particle of the present disclosure is used as an optical filter in a contact lens. For example, the contact lens is a hydrogel-based contact lens, such as a methacrylate-based or hydroxyethyl methacrylate (HEMA)-based hydrogel. For example, the hydrogel-based contact lens is a silicone hydrogel-based contact lens.

III. Methods of the Present Disclosure

In another aspect, the present disclosure includes a method of preparing a contact lens monomer composition comprising
providing a composite particle of the present disclosure; and
mixing the composite particle with a polymerisable monomer, and a catalyst suitable for initiating polymerization of the polymerisable monomer.

In another aspect, the present disclosure includes a method of preparing a contact lens comprising
preparing a contact lens monomer composition by a method of the present disclosure; and
polymerizing the contact lens monomer solution.

In some embodiments, the contact lens monomer composition is a contact lens monomer composition of the present disclosure.

The following non-limiting examples are illustrative of the present disclosure:

EXAMPLES

Example 1 Preparation of Exemplary TPTP Composite Particles

A 20 mL stock solution was prepared in THF with 20.1 mg TPTP dye (1.02 mg/mL) and 202.5 mg of PDMS(8,000)-b-PAA(8,000) (10.13 mg/mL). The solution was stirred to dissolve the dye, filtered, then the polymer was added and the solution was stirred overnight to dissolve. The solution was passed through a microfluidic nanoparticle generation system, for example the Dolomite™ Nanoparticle Generation system, to combine water with THF (900 µL/min water, 100 µL/min THF stock solution). This produced ~80 mL of polymer micelle solution. To this solution was added poly(ethylene glycol) (PEG, average $M_n$=4,000) then stirred to dissolve to produce a final PEG concentration of ~10 mg/mL. This solution was then lyophilized to dry the particle additives. Alternate drying methods, such as suction filtration using membrane-pore filters, have also been identified as suitable drying methods for this formulation.

Example 2 Preparation of Exemplary Contact Lenses Comprising TPTP Composite Particles A solution of contact lens monomer (conventional hydrogel formulation comprising up to 60 wt % hydroxyethyl methacrylate (HEMA)) with a free-radical initiating agent such as a thermal initiating agent (for example, suitable initiators include azobisisobutyronitrile (AIBN), 1,1-azobis(cyclohexanecarbonitrile), 2,2'-azobis(2-methylpropionitrile), and the like) was prepared by adding an appropriate amount of the initiator in the contact lens monomer solution. This initiator was allowed to dissolve, then the resulting solution was stored in the fridge.

Figure 2:
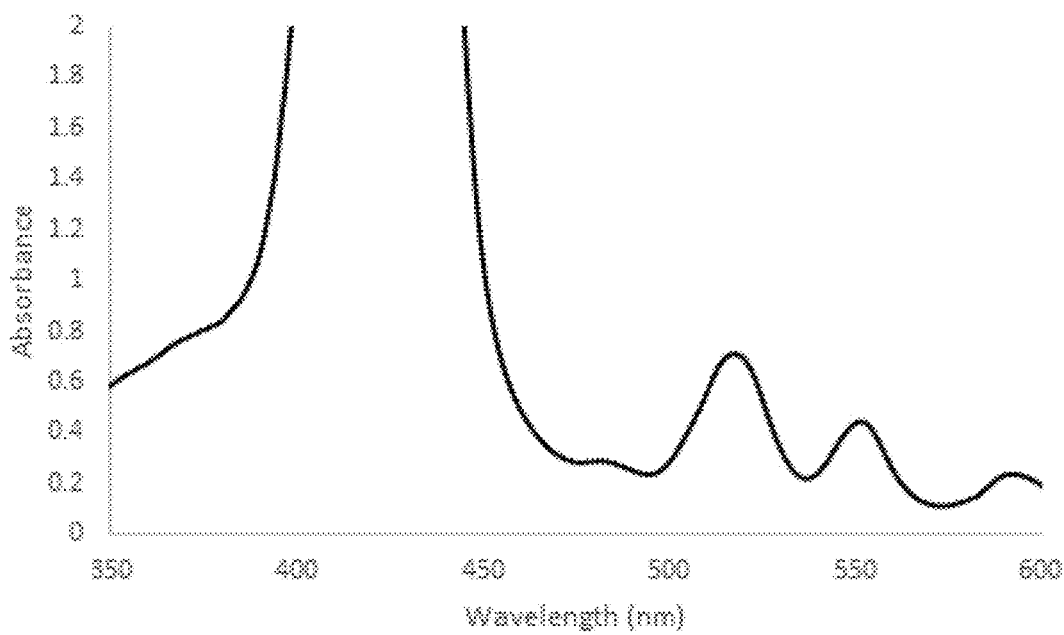
FIG. 2 shows absorbance of a contact lens monomer solution containing the composite particle as prepared in Example 2 prior to contact lens fabrication. The solution was prepared to have an absorbance of approximately 0.70 at 516 nm (porphyrin $Q_{IV}$ absorbance peak).

To prepare contact lenses, dried micelle particles were resuspended in contact lens+AIBN monomer solution by adding the dried particle additives to the monomer solution, to reach an absorbance at 518 nm of about 0.7 to 0.8 (pathlength=0.44 cm). For example, for the purpose of this example, an approximately concentration of dried particles in contact lens+AIBN monomer solution of about 1.6 mg/mL was used. The resulting was then the solution was vortex mixed until the particles were resuspended homogenously. Before making contact lenses, the resulting particle loaded solution was measured on the UV-Vis spectrometer (Agilent™ 8453 spectrophotometer, instrument blanked to contact lens +AIBN monomer solution) to confirm the dye containing particles were present in sufficient concentration. The absorbance spectrum of the monomer solution is shown in FIG. 2. Once the desired concentration were reached, aliquots of this monomer solution were dosed into contact lens molds and thermally cured to create a dried contact lens. After the curing was complete, the lenses were removed and fully hydrated in saline.

Example 3 Lens Central Thickness Measurements

After lenses were prepared and equilibrated in saline solution as described in Example 2, thickness measurements were performed using the Rehder™ ET-3 Electronic Thickness Gauge. Measurements were performed on hydrated lenses quickly after removing from saline to ensure that there was minimal dehydration resulting from evaporation. Lenses were each measured in triplicate with averages and standard deviations recorded for each. The measurements of five exemplary lenses are presented in Table 1.

TABLE 1

Thickness Measurements of Contact Lenses Comprising Composite Particles (in µm)

| Lens | Measurement 1 | Measurement 2 | Measurement 3 | Average | Std. Dev. |
|---|---|---|---|---|---|
| 1 | 77 | 79 | 73 | 76 | 3 |
| 2 | 85 | 87 | 87 | 86 | 1 |
| 3 | 85 | 85 | 86 | 85 | 1 |
| 4 | 81 | 81 | 83 | 82 | 1 |
| 5 | 73 | 67 | 70 | 70 | 3 |
| | | | Overall average | 80 | |
| | | | Overall Std. Dev. | | 5 |
| | | | Average Std. Dev. | | 1 |

The fabricated contact lenses were made using moulds designed to produce lenses with a central thickness of 70±30 µm. It was found that the majority of the lenses fell within this range. The average thickness of the five lenses is displayed below in Table 2.

TABLE 2

Thickness Measurement Comparison

| Lenses Tested | Average Thickness (µm) | Std. Dev. (µm) | Pass rate (%) |
|---|---|---|---|
| 5 | 80 | 5 | 100 |

Example 4 Ethanol Extraction

An ethanol extraction was performed to determine the amount of dye leaching that could result during commercial manufacturing of contact lenses. The lenses were initially measured using a UV/Vis spectrometer while immersed in saline solution, then each lens was submerged in ethanol for a commercially relevant length of time, followed by submersion in saline to remove remaining ethanol from lenses. The lenses were then remeasured to collect the final absorbance/transmission spectra.

Figure 3:
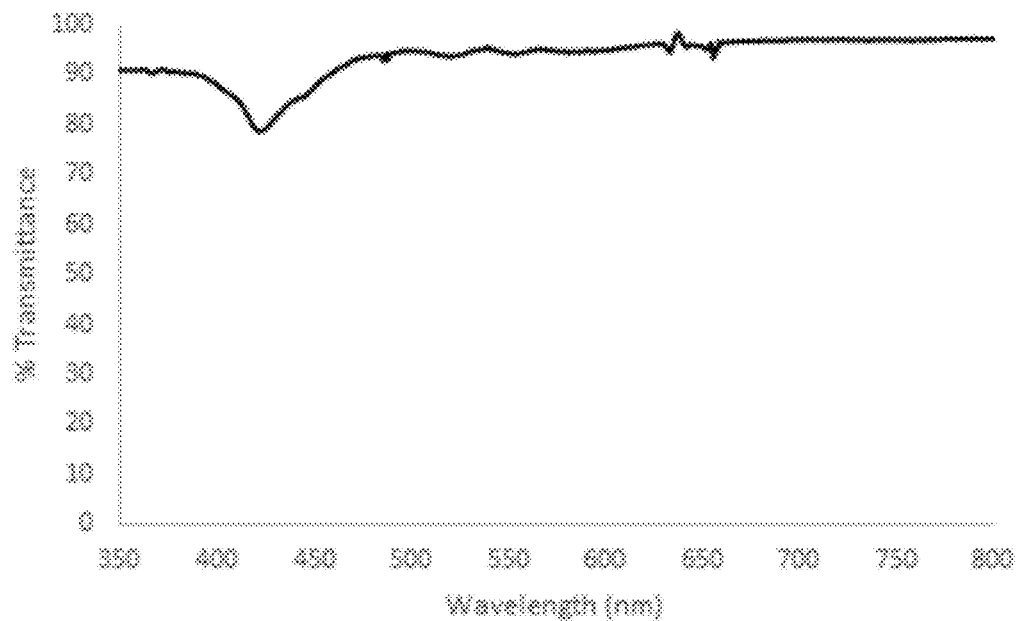
FIG. 3 shows a sample transmission spectrum of a lens prepared in Example 2 before ethanol extraction (Panel A) and after ethanol extraction (Panel B).
Figure 3:
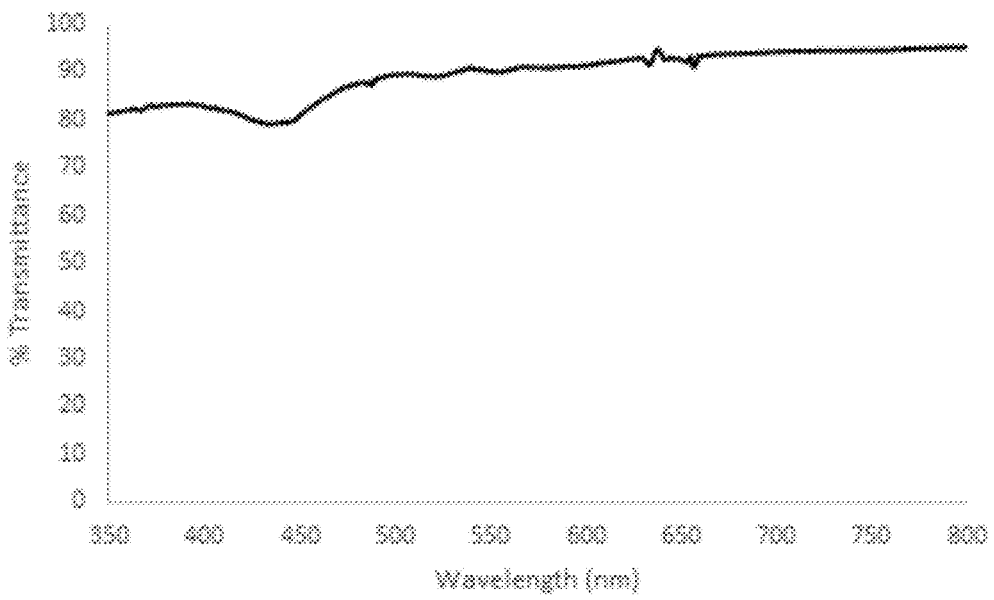
Figure 4:
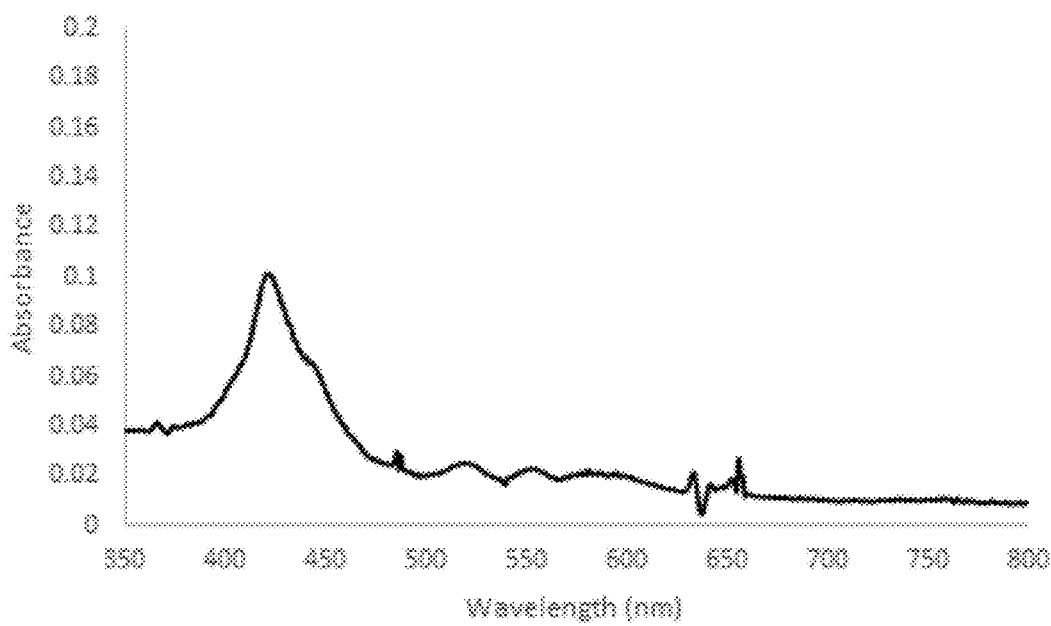
FIG. 4 shows a sample absorbance spectrum of a lens prepared in Example 2 before ethanol extraction (Panel A) and after ethanol extraction (Panel B).
Figure 4:
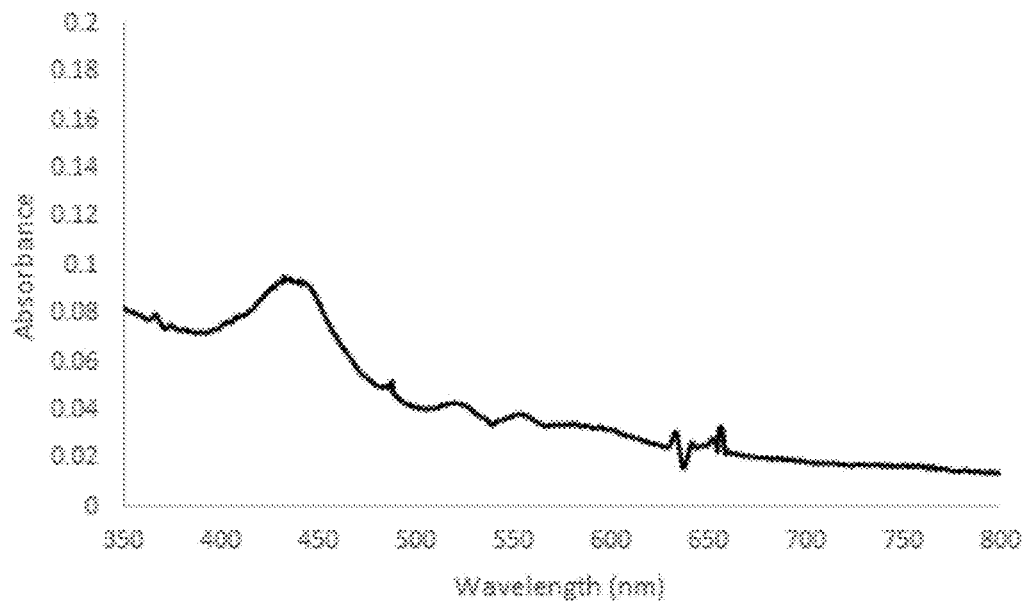

UV-Vis transmission spectra were collected for lens before and after ethanol extractions. The transmission spectra for the lens are shown in FIG. 3. The absorbance spectra for the lens are shown in FIG. 4.

The In-Band transmission was measured as an average transmission within the range of 415-450 nm ("In-Band"), as well as the Out-Band transmission from 450-800 nm ("Out-Band"), averaged in 1 nm increments.

The In-Band transmission measurement generally corresponds to the Blue Light Hazard range, 415 nm to 455 nm defined by the International Commission on Non-Ionizing Radiation Protection (ICNIRP) and generally agreed upon as an appropriate target for blue light mitigating products.

A lower In-Band measurement corresponds to more effective blue light filtration. The Out-of-Band transmission relates to the general optical clarity of the lens. It is generally desirable to have a low In-Band transmission, while preserving the high Out-of-Band transmission.

The In-Band and Out-of-Band transmission measurements can be used to assess characteristics of blue light filtering lenses. Meaning measurements are usually performed after ethanol extraction to account for harsh manufacturing conditions during lens fabrication.

Ethanol extraction data for five exemplary lenses is shown in Table 3. The results show the in-band and out-of-band transmittance before and after the ethanol extraction. Data is highlighted to indicate whether the transmittance passes the design criteria. In-band pass: % T<90, out-of-band pass:% T>90.

TABLE 3

Ethanol Extraction Data

| Lens $\Delta\lambda_{max}$ | Initial in-band % T | Initial out-of-band % T | Final In-Band % T | Final Out-of-Band % T |
|---|---|---|---|---|
| 1 | 82.7 | 96.5 | 80.1 | 93.9 |
| 2 | 82.2 | 94.9 | 81.1 | 98.6 |
| 3 | 79.9 | 91.3 | 76.0 | 90.2 |
| 4 | 81.3 | 90.7 | 80.9 | 94.4 |
| 5 | 83.8 | 91.3 | 79.7 | 98.6 |
| Average | 82.0 | 92.9 | 79.6 | 95.1 |

The results of the ethanol extraction testing demonstrated that the lenses comprising the composite particle of the present disclosure was able to withstand ethanol extraction. The finished lenses demonstrated effective blue light blocking, with an average In-Band transmission of 79.6% while maintaining an average Out-of-Band transmission of 95.1%, an effective 15.5% decrease in transmission due to the blue light filter composite particle of the present disclosure.

These characteristics were largely maintained after the ethanol extraction. In fact, the In-Band transmission decreased after the ethanol extraction, meaning the lenses became more effective after the extraction, as opposed to becoming less effective, as has been seen with other optical filtering dyes. This shows that the TPTP dye remained in the lens after fabrication and ethanol extraction. A comparison of the average absorbance decrease and transmission and pass rate of the in-band and our-of-band transmission is shown in Table 4.

TABLE 4

Average Absorbance and Transmission for In-Band and Out-of-Band

| Average $\Delta\lambda_{max}$ | Average In-band % T | In-Band Pass rate (%) | Average Out-of-Band % T | Out-of-Band Pass rate (%) |
|---|---|---|---|---|
| 13.9 | 79.6 | 100 | 95.1 | 100 |

Example 4 Comparative Experiments Between Blue Light Absorbing Dyes

Figure 5:
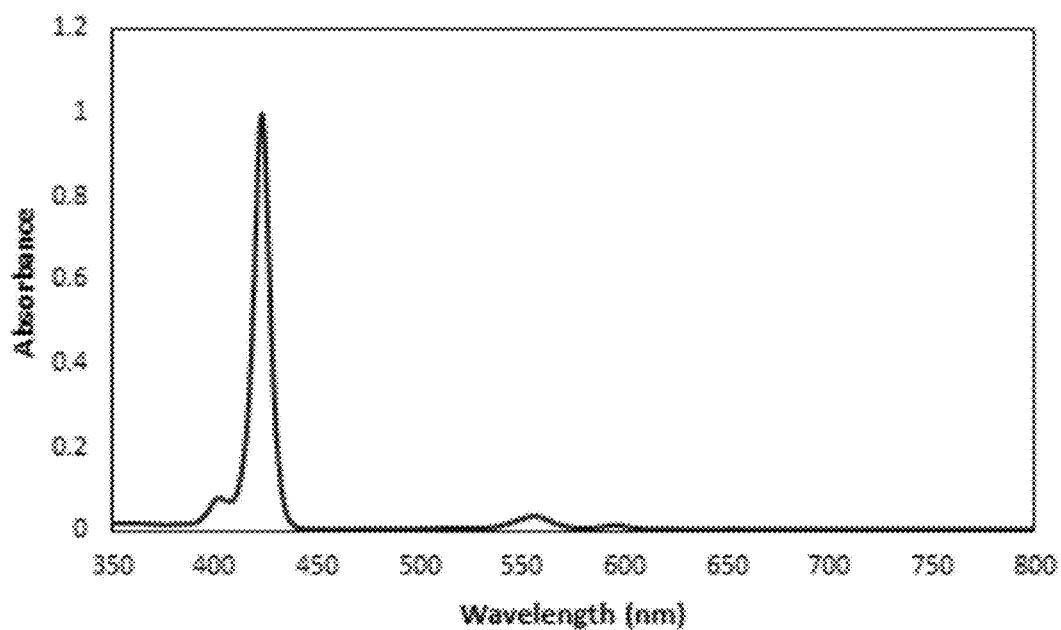
FIG. 5 shows a UV-Vis absorbance spectrum of ZnTPP in THF (1 µg/mL).

It can be appreciated that dyes suitable for use in blue-light filtration generally have strong absorbance within the blue light region of for example 415-450 nm. Additionally, dyes with strong and narrow absorbance bands (termed notch filters) are desirable as these tend to give relatively less tinting when compared to filters with broader absorption. Many different classes of dyes have absorbance peaks within the desired region, including porphyrins, perylenes, coumarins, acridines, indolenins, and others. Of these dyes, porphyrin structures tend to have strong and narrow absorbance peaks characteristic of notch filters, while many others are broad filter dyes, and may have limited applicability. As an example, a UV-Vis spectrum for the ZnTPP dye in THF is shown in FIG. 5, which shows the sharp and narrow absorbance peak of the dye. All porphyrin dyes have a strong absorption band typically between 400 and 450 nm called the Soret band which makes these dyes useful as blue light filters. Additionally, porphyrin dyes have smaller absorbance peaks at higher wavelengths referred to as Q bands, which can appear between 500 and 750 nm. The position and intensity of porphyrin Soret bands and Q bands depend on the metalation and substitution of the porphyrin, as well as its protonation state, and the degree of aggregation of the porphyrin.

A number of dyes (Scheme 1) were selected and studied for their properties. Initial experiments compared the UV-Vis absorbance spectra of the dyes both in tetrahydrofuran (THF) solutions and in contact lenses. This helped determine which dyes give absorbance peaks that are positioned well within the blue light region, and which dyes gave narrow enough absorbance peaks to act as notch filters. Preparing composite particles comprising dye and amphiphilic copolymer to add the dyes to contact lenses allowed comparison of integration into and stability in contact lens. Contact lenses were then prepared for each different dye to give an in-band transmission of approximately 75%. As the dyes have different peak positions, peak widths, and extinction coefficients, different concentrations of dye were loaded micelles in the final contact lenses. These different blue light filtering lenses were then compared for their level of tint and their observed color. Finally, ethanol extraction of the lenses was used to determine tolerance to standard contact lens manufacturing in terms of dye retention.

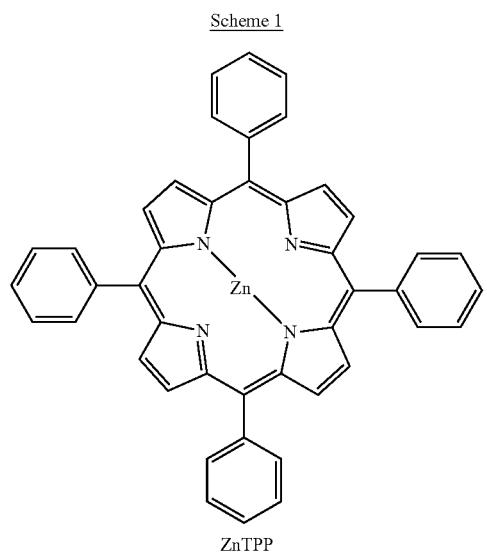

Scheme 1

ZnTPP

-continued
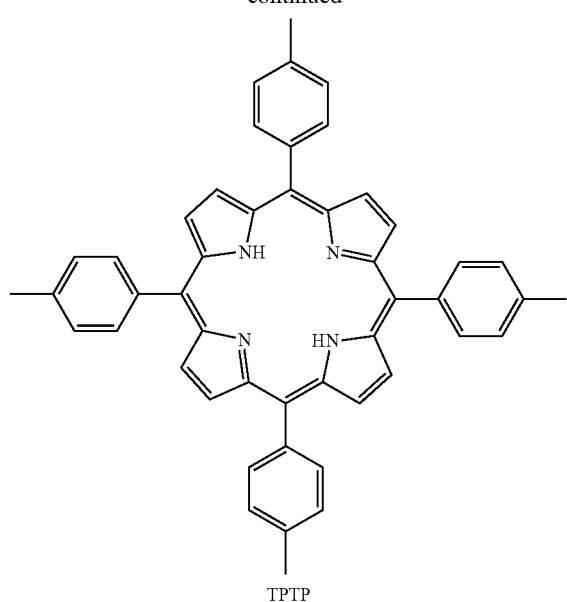
TPTP
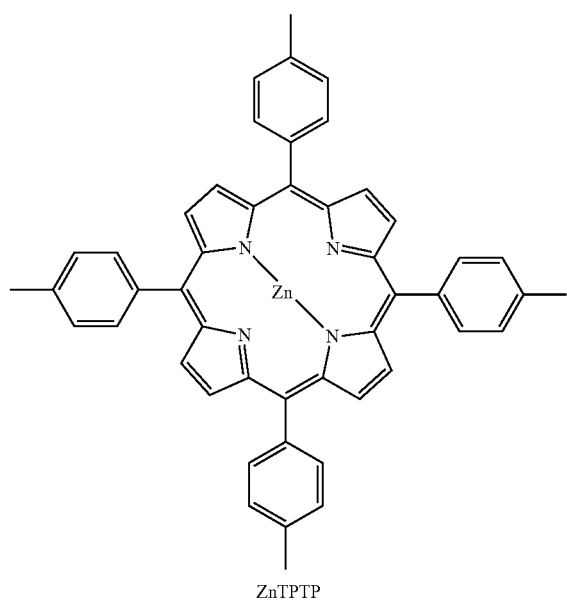
ZnTPTP
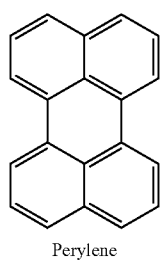
Perylene
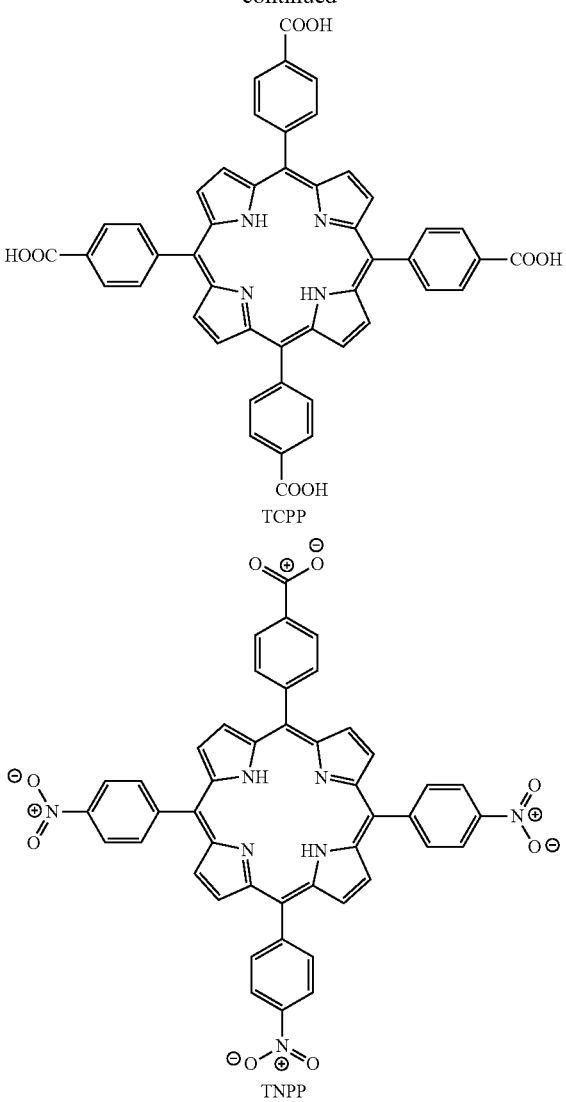
TCPP
TNPP

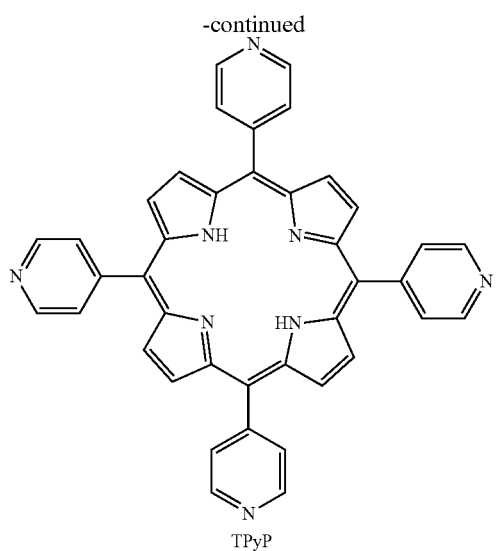

TPyP

MgTPP·H₂O

The following composite particles were prepared using methods similar to those of Examples 1 and 2. Each composite particle is resuspended in contact lens monomer solution with thermal initiator (e.g. AIBN). The resulting mixture is cast in contact lens molds and thermally cured.

CS220: (ZnTPP) Dye encapsulated nanoparticles {zinc 5,10,15,20-tetraphenylporphyrin (dye)/(1,2)poly(butadiene)(15,000)-b-poly(acrylic acid)(6,500)}

CS222: (ZnTPTP) Dye encapsulated nanoparticles {zinc 5,10,15,20-(tetra-p-tolyl)porphyrin (dye)/(1,2)poly(butadiene)(15,000)-b-poly(acrylic acid)(6,500)}

CS223: (TCPP) Dye encapsulated nanoparticles {5,10,15,20-(tetra-4-carboxyphenyl)porphyrin (dye)/(1,2)poly(butadiene)(15,000)-b-poly(acrylic acid)(6,500)}

CS224: (TNPP) Dye encapsulated nanoparticles {5,10,15,20-(tetra-4-nitrophenyl) porphyrin (dye)/(1,2)poly(butadiene)(15,000)-b-poly(acrylic acid)(6,500)}

CS225: (TPyP) Dye encapsulated nanoparticles {5,10,15,20-(tetra(4-pyridyl)porphyrin (dye)/(1,2)poly(butadiene)(15,000)-b-poly(acrylic acid)(6,500)}

CS226: (MgTPP) Dye encapsulated nanoparticles {magnesium 5,10,15,20-tetraphenylporphyrin hydrate (dye)/(1,2)poly(butadiene)(15,000)-b-poly(acrylic acid)(6,500)}

CS227: (Perylene) Dye encapsulated nanoparticles {perylene (dye)/(1,2)poly(butadiene)(15,000)-b-poly(acrylic acid)(6,500)}

Z005 blank lens was used as control and was prepared with contact lens monomer solution with 0.3% azobisisobutyronitrile (AIBN) w/w. Solutions cast in contact lens moulds (0.045 mL), then cured for 30 minutes at 100° C.

Preparation of Dye Solutions in THF

Solutions were prepared of each selected dye in THF at a dye concentration of approximately 1 mg/mL (exact masses given below in Table 1), stirred to dissolve, then 10 μL of this solution was diluted to 10 mL (1000× dilution). These solutions were then measured for their UV-Vis spectra, compared against a blank set to pure THF. UV-Vis spectra were collected using quartz cuvettes and an Agilent 8453 UV-Vis spectrophotometer. Dye solutions are presented in Table 5.

TABLE 5

Dye Solutions Prepared

| Dye | Dye Mass (mg) | THF Volume (mL) | Dilution Factor | Conc. (μg/mL) | Mol. Weight (g/mol) | Concentration (mol/L) |
| --- | --- | --- | --- | --- | --- | --- |
| ZnTPP | 10.2 | 10.0 | ×1000 | 1.02 | 678.12 | $1.5 \times 10^{-6}$ |
| ZnTPTP | 10.2 | 10.0 | ×1000 | 1.02 | 734.22 | $1.4 \times 10^{-6}$ |
| TCPP | 10.5 | 10.0 | ×1000 | 1.05 | 790.79 | $1.3 \times 10^{-6}$ |
| TNPP | 10.4 | 10.0 | ×1000 | 1.04 | 794.74 | $1.3 \times 10^{-6}$ |
| TPyP | 10.3 | 10.0 | ×1000 | 1.03 | 618.70 | $1.7 \times 10^{-6}$ |
| MgTPP | 2.6 | 2.0 | ×1000 | 1.30 | 655.06 | $2.0 \times 10^{-6}$ |
| Perylene | 9.7 | 10.0 | ×1000 | 0.97 | 252.30 | $3.8 \times 10^{-6}$ |

Figure 6:
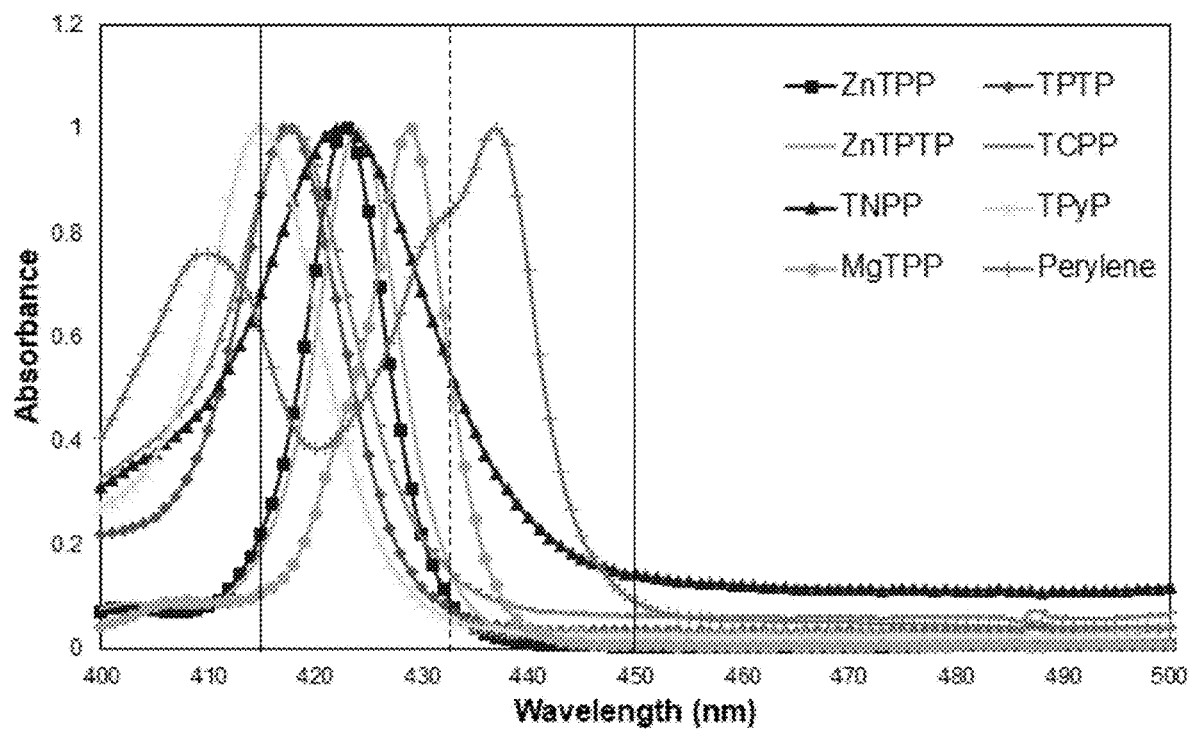
FIG. 6 shows an overlay of UV-Vis spectra of eight different blue filtering dyes in THF. The borders of the blue light region (415-450 nm) are shown with vertical solid lines, while the centre of the blue light region (432.5 nm) is shown with a vertical dotted line.
Figure 7:
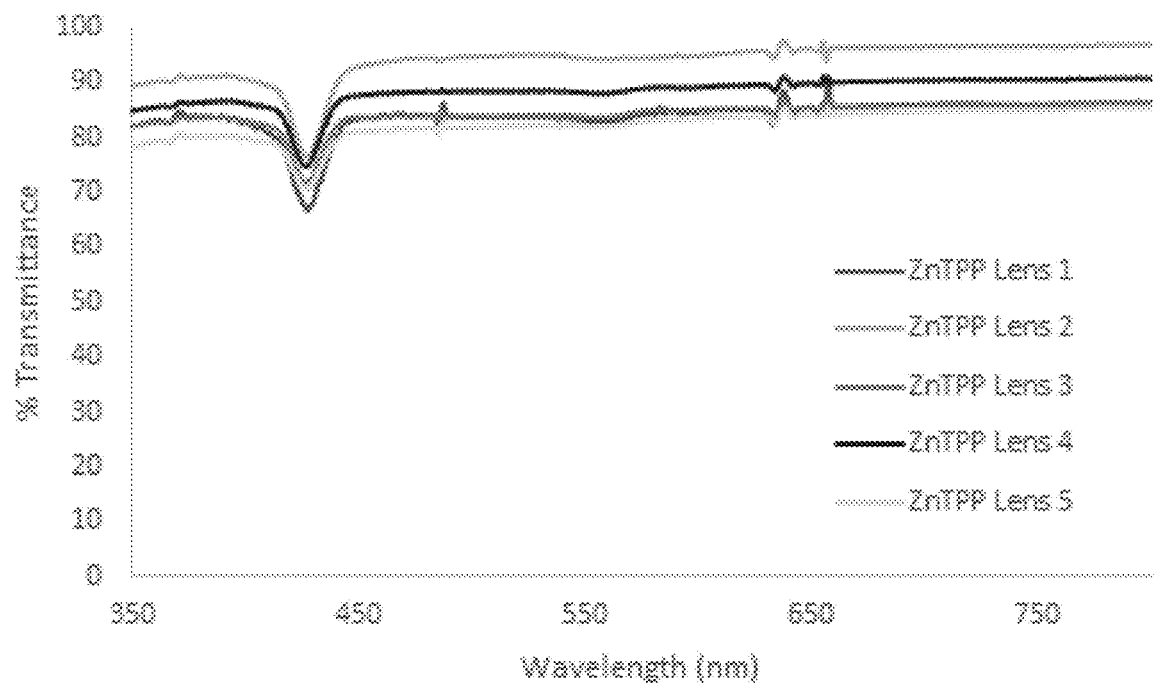
FIG. 7 shows transmittance spectra of five ZnTPP containing lenses that have an average in-band transmission of approximately 75%.
Figure 8:
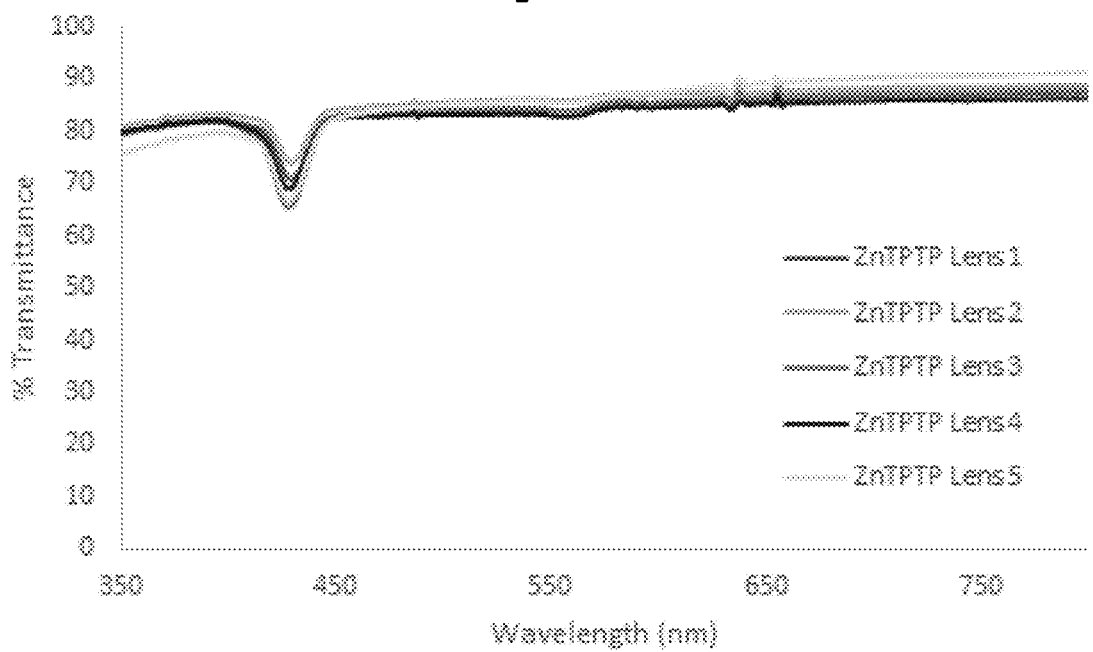
FIG. 8 shows transmittance spectra of five ZnTPTP lenses that have an average in-band transmission of approximately 75%.
Figure 9:
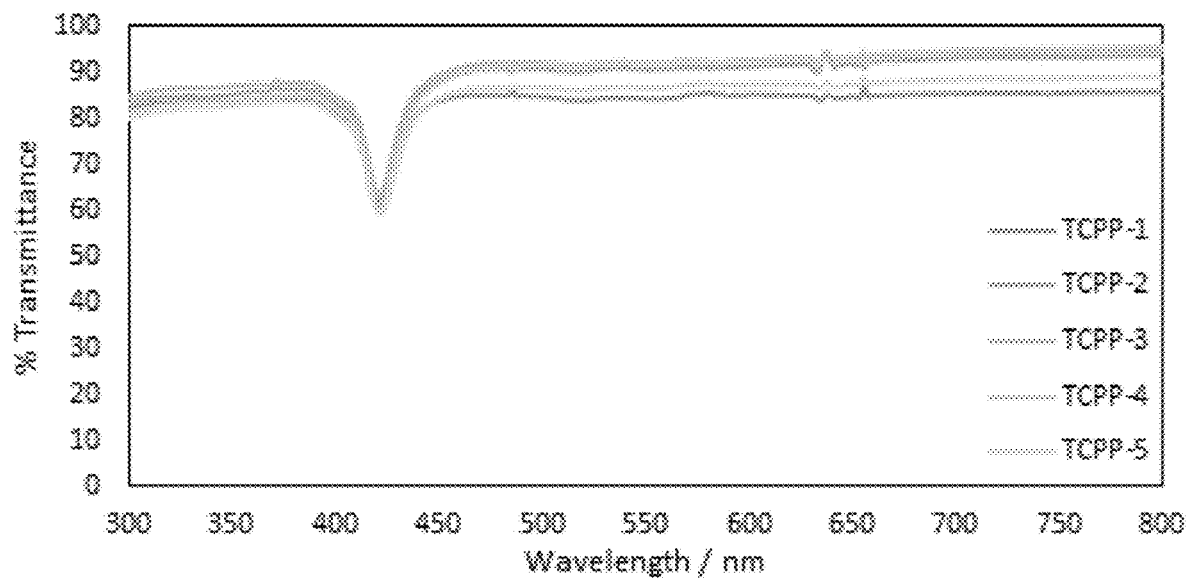
FIG. 9 shows transmittance spectra of five TCPP lenses that have an average in-band transmission of approximately 75%.
Figure 10:
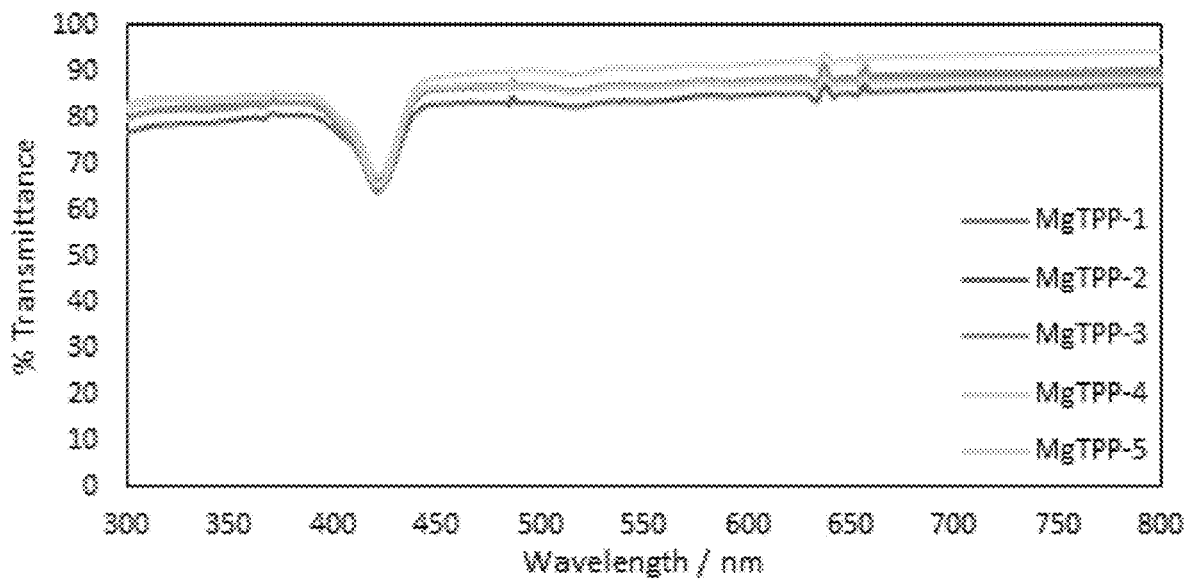
FIG. 10 shows transmittance spectra of five MgTPP lenses that have an average in-band transmission of approximately 75%.
Figure 11:
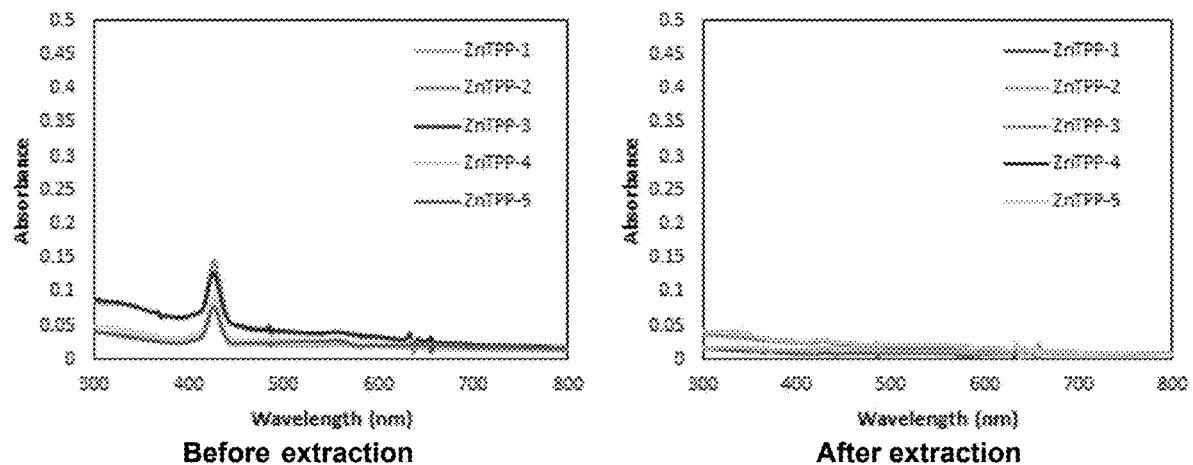
FIG. 11 shows absorbance spectra of composite particle comprising contact lenses before (left) and after (right) ethanol extraction. Panel (A) shows the spectra for ZnTPP comprising contact lenses; panel (B) shows the spectra for ZnTPTP comprising contact lenses; panel (C) shows the spectra for TCPP comprising contact lenses; panel (C) shows the spectra for MgTPP comprising contact lenses.
Figure 11:
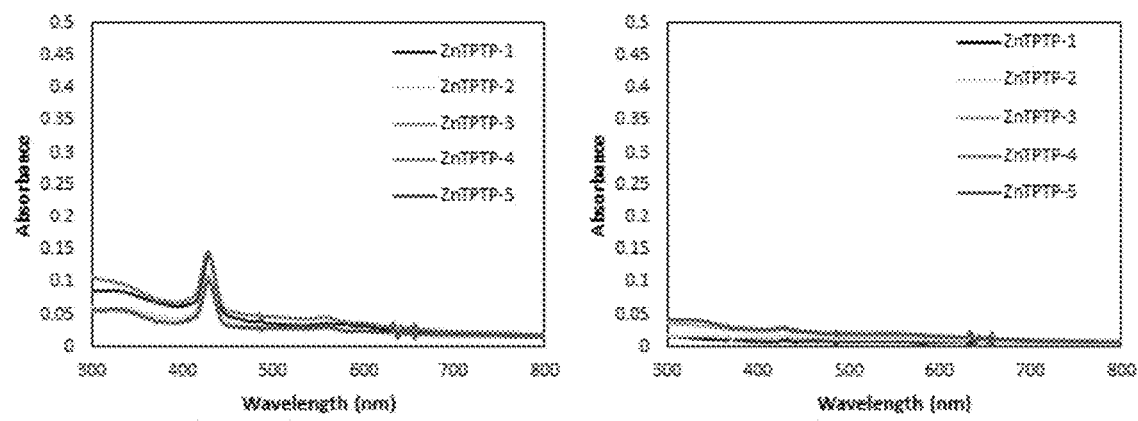
Figure 11:
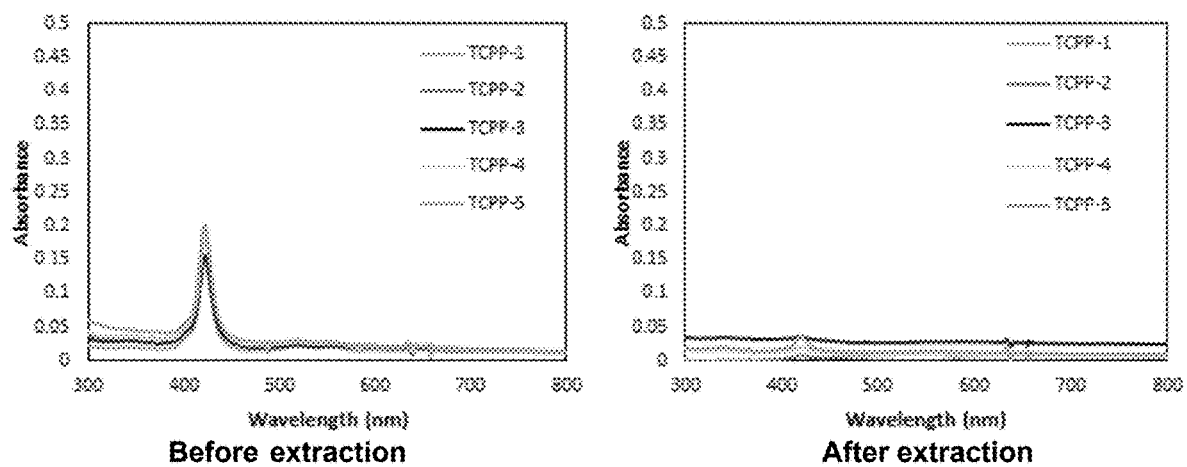
Figure 11:
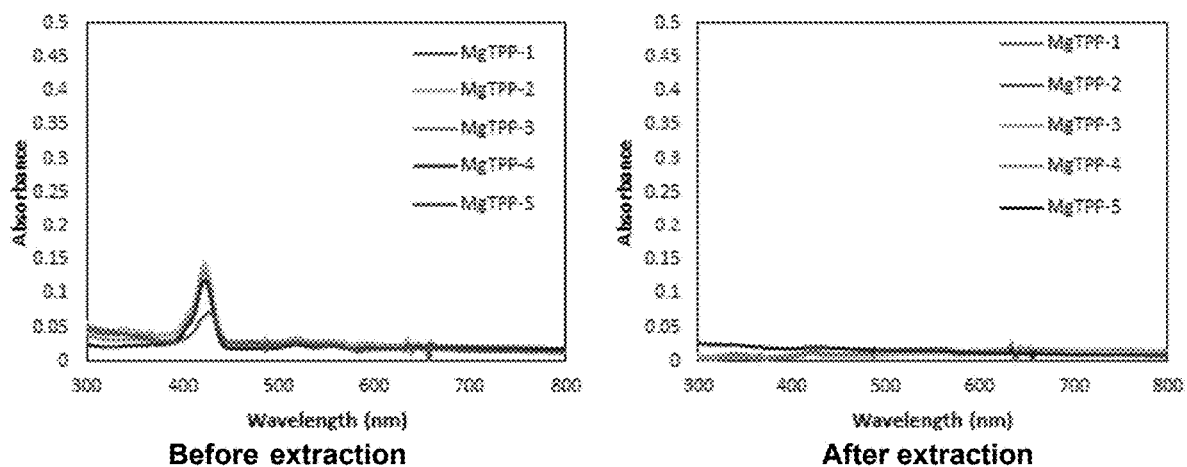

The dye solutions in THF were measured on the Agilent 8453 UV-Vis spectrophotometer after blanking the instrument with THF. The resulting absorbance spectra were normalized to have a maximum absorbance of one, then plotted, as shown in FIG. 6.

Preparation of Composite Particles Comprising Dye

Stock solutions of each dye were prepared with ~1 mg/mL of dye and ~10 mg/mL of polymer and stirred to dissolve both components. Exact masses for dyes and polymers are shown below in Table 6. Solutions were prepared by first dissolving the dye in 10 mL THF, then removing 2 mL of this THF solution to dissolve the polymer. The THF stock solutions were then passed through the Dolomite microfluidics system with a 5 Input Chip 3D microfluidic reactor to combine water with THF in a 9:1 flow rate ratio (900 µL/min water, 100 µL/min THF stock solution). After the particles were prepared, PEG 4000 was added to each to give a concentration of ~10 mg/mL and were stirred to dissolve. The particle solutions were then lyophilized to obtain a dried powder of the composite particle additive. Solutions prepared are presented in Table 7.

TABLE 7

Solutions for Composite Particle Preparation

| Dye | Dye Mass (mg) | Initial THF Volume (mL) | Dye Concentration (mg/ml) | PbD-b-PAA Mass (mg) | Final THF Volume (mL) | PbD-b-PAA Concentration (mg/mL) |
|---|---|---|---|---|---|---|
| ZnTPP | 9.8 | 10 | 0.98 | 20.7 | 2 | 10.35 |
| ZnTPTP | 10.2 | 10 | 1.02 | 20.5 | 2 | 10.25 |
| TCPP | 10.4 | 10 | 1.04 | 19.4 | 2 | 9.70 |
| TNPP | 9.6 | 10 | 0.96 | 19.4 | 2 | 9.70 |
| TPyP | 9.9 | 10 | 0.99 | 20.5 | 2 | 10.25 |
| MgTPP | 9.8 | 10 | 0.98 | 19.9 | 2 | 9.95 |
| Perylene | 10.5 | 10 | 1.05 | 21.1 | 2 | 10.55 |

A solution of contact lens monomer was prepared using an appropriate amount of a thermal initiator. The initiator was allowed to dissolve, and the resulting solution was then stored at 4° C. until use.

To prepare contact lenses, dried composite particles were resuspended in the contact lens monomer and mixed until the particles were resuspended homogenously. Before making contact lenses, this particle loaded solution was measured on the UV-Vis spectrometer (Agilent 8453 spectrophotometer, instrument blanked to contact lens monomer +AIBN solution) to confirm the dye containing particles were present in high enough concentration. Once the desired concentration was reached, aliquots of the contact lens monomer were inserted into a contact lens mold, then thermally cured. After the curing, the lenses were fully hydrated in saline before spectral measurements.

To determine the absorbance spectra of each dye, batches of lenses were prepared with each dye using methods and composite particle solutions described above at an arbitrary concentration. UV/Vis measurements were taken of each lens and normalized, to allow similar comparisons as were made on the dyes in THF solutions. Based on the difficulty of fabrication of some of these lenses, some dyes were eliminated from future experiments.

The dye loaded contact lenses were measured on the Agilent 8453 UV-Vis spectrophotometer after blanking the instrument with saline. The resulting absorbance spectra were normalized to have a maximum absorbance of one.

For each remaining dye, a different initial absorbance for the monomer solution was required to create lenses with in-band transmission values of approximately 75%. To determine the amount of dye required, lenses were initially made with a particular monomer absorbance, then fabricated into lenses. After hydrating and measuring the absorbance and in-band transmission, the absorbance required to achieve in-band transmission of 75% was calculated by multiplying the lens absorbance values by a scaling factor to give the desired in-band transmission, then adjusting the monomer solution absorbance by the same amount in the next batch of contact lenses. This was performed a number of times for each dye until an acceptable number of lenses were produced with the desired transmittance values.

Contact lenses were prepared in the same way as above for ZnTPP, ZnTPTP, TCPP, and MgTPP. For each dye, a different monomer solution absorbance was required. The absorbance wavelengths and values used to make the lenses with appropriate dye loading are shown below in Table 8. Because of the large difference in the pathlength between a typical cuvette and a contact lens, the monomer solution needs to be very concentrated, such that the absorbance is too high to accurately measure using the porphyrin Soret band. For this reason, solutions are prepared by tracking the absorbance of the first Q band appearing around 500-550 nm, as these peaks can be accurately measured using the UV-Vis instrument.

TABLE 8

Absorbance Wavelengths and Values Required for In-Band Transmission of Approximately 75%

| Dye | Absorbance Wavelength (nm) | Absorbance Value (A.U.) |
|---|---|---|
| ZnTPP | 556 | 0.6076 |
| TPTP | 518 | 0.5478 |
| ZnTPTP | 557 | 0.9014 |
| TCPP | 516 | 0.4956 |
| MgTPP | 514 | 0.5959 |

After lenses were prepared with appropriate loading of each dye, they were measured both for their absorbance/transmittance using the Agilent 8453 UV-Vis, and for their central lens thickness using the Rehder ET-3 electronic thickness gauge. Transmittance spectra for each dye are shown below in FIGS. 8-11. The calculated in-band and out-of-band transmission are shown in Table 49 Contact lens thickness measurements are shown in Table 10.

TABLE 9

In-Band Transmission Values for Five Exemplary Lenses Comprising five Different Dyes

| Dye | In-Band | | | | | | | Out-Band | |
|---|---|---|---|---|---|---|---|---|---|
| | Lens 1 | Lens 2 | Lens 3 | Lens 4 | Lens 5 | Average | Std. Dev. | Average | Std. Dev. |
| ZnTPP | 75.9 | 85.1 | 78.7 | 81.9 | 76.2 | 79.6 | 3.9 | 87.7 | 4.9 |
| TPTP | 75.9 | 74.8 | 77.1 | 78.9 | 73.9 | 76.3 | 2.0 | 85.9 | 1.7 |
| ZnTPTP | 77.1 | 79.6 | 74.2 | 76.2 | 74.4 | 76.3 | 2.2 | 86.4 | 1.2 |
| TCPP | 73.5 | 76.9 | 77.8 | 74.7 | 72.6 | 75.1 | 2.2 | 90.0 | 3.7 |
| MgTPP | 76.8 | 74.0 | 75.7 | 77.3 | 76.8 | 76.1 | 1.3 | 87.6 | 3.0 |

TABLE 10

Exemplary Contact Lenses Thickness (μm)

| Lens | Measure 1 | Measure 2 | Measure 3 | Average | Std. Dev. |
|---|---|---|---|---|---|
| ZnTPP-1 | 93 | 90 | 90 | 91 | 2 |
| ZnTPP-2 | 90 | 91 | 90 | 90 | 1 |
| ZnTPP-3 | 102 | 103 | 103 | 103 | 1 |
| ZnTPP-4 | 102 | 102 | 101 | 102 | 1 |
| ZnTPP-5 | 85 | 84 | 87 | 85 | 2 |
| TPTP-1 | 77 | 79 | 78 | 78 | 1 |
| TPTP-2 | 98 | 98 | 102 | 99 | 2 |
| TPTP-3 | 95 | 91 | 89 | 92 | 3 |
| TPTP-4 | 80 | 77 | 77 | 78 | 2 |
| TPTP-5 | 76 | 72 | 72 | 73 | 2 |
| ZnTPTP-1 | 87 | 88 | 88 | 88 | 1 |
| ZnTPTP-2 | 79 | 77 | 76 | 77 | 2 |
| ZnTPTP-3 | 86 | 88 | 87 | 87 | 1 |
| ZnTPTP-4 | 81 | 81 | 82 | 81 | 1 |
| ZnTPTP-5 | 89 | 89 | 90 | 89 | 1 |
| TCPP-1 | 76 | 76 | 77 | 76 | 1 |
| TCPP-2 | 84 | 86 | 84 | 85 | 1 |
| TCPP-3 | 82 | 81 | 82 | 82 | 1 |
| TCPP-4 | 79 | 79 | 80 | 79 | 1 |
| TCPP-5 | 82 | 83 | 83 | 83 | 1 |
| MgTPP-1 | 76 | 75 | 76 | 76 | 1 |
| MgTPP-2 | 71 | 70 | 70 | 70 | 1 |
| MgTPP-3 | 78 | 76 | 75 | 76 | 2 |
| MgTPP-4 | 80 | 80 | 82 | 81 | 1 |
| MgTPP-5 | 74 | 73 | 72 | 73 | 1 |

Ethanol Extraction

To compare the dye retention of the different lenses during an ethanol extraction, the lenses were measured for their UV-Vis absorbance spectra, then submerged in ethanol for a length of time, followed by submersion in saline to remove the ethanol from the lenses. After equilibration, the lenses were re-measured. The length of time the lenses are submerged in ethanol could be the time that a typical contact lens is required to be submerged in ethanol or another similar solvent during contact lens manufacture. For example, this length of time can be about 10 min to about 4 hours, about 30 min to about 3.5 hours, about 1 hour to about 3.5 hours, about 1.5 hours to about 3.5 hours, about 1.5 hours to about 3 hours, or about 2 hours to about 3 hours. Optionally, the length of time for ethanol exposure can be about 1 hour, about 1.5 hours, about 2 hours, about 2.5 hours, or about 3 hours. Optionally, following ethanol exposure, the extracted lenses can be soaked in saline for a suitable period of time. For example, this length of time can be about 10 min, about 15 min, about 20 min, about 25 min, about 30 min, about 35 min, about 40 min, about 45 min, about 1 hour, about 1.5 hours, about 2 hours, about 2.5 hours, or about 3 hours. For the purpose of this example, the lenses were submerged in ethanol for about 2 hours and soaked in saline. To determine the amount of dye leaching for each lens, the peak absorbance corresponding to the Soret band was compared both before and after the ethanol extraction. In cases where the dye leaching resulted in no visible peak for the Soret band, the absorbance at the same wavelength of the original Soret peak was used in place of the peak absorbance. The in-band (415-450 nm) and out-of-band (450-800 nm) average transmission values were also calculated for each lens both before and after ethanol extraction.

The ethanol extraction data allows a comparison of how much dye is leaching out of the different lenses. Tabulated data for the ethanol extractions include the initial and final absorbance corresponding to the Soret absorbance peak for the different dyes, the percent change in the Soret absorbance peak for each lens and each set of lenses, and the average in-band and out-of-band transmission for each lens before and after the ethanol extractions. This data is shown below in Tables 11 to 14. Absorbance spectra used for calculating the dye leaching are shown below in FIGS. 15(A)-(D).

TABLE 11

Ethanol Extraction data for ZnTPP Comprising Contact Lenses

| | EtOH Extration | | Before EtOH Extraction | | After EtOH Extraction | |
|---|---|---|---|---|---|---|
| Lens | Initial Abs | Final Abs. | In-Band % T | Out-of-Band % T | In-Band % T | Out-of-Band % T |
| ZnTPP-1 | 0.0932 | 0.0106 | 84.1 | 92.3 | 90.5 | 90.8 |
| ZnTPP-2 | 0.1469 | 0.0170 | 77.4 | 91.9 | 90.3 | 91.7 |
| ZnTPP-3 | 0.1290 | 0.0273 | 79.0 | 91.3 | 31.0 | 93.8 |
| ZnTPP-4 | 0.0909 | 0.0306 | 79.3 | 86.1 | 87.9 | 91.3 |
| ZnTPP-5 | 0.0783 | 0.0306 | 81.2 | 86.5 | 87.9 | 91.3 |
| ZnTPP Av. | | | 80.2 | 89.6 | 89.5 | 91.8 |

TABLE 12

Ethanol Extraction data for ZnTPTP Comprising Contact Lenses

| | EtOH Extration | | Before EtOH Extraction | | After EtOH Extraction | |
|---|---|---|---|---|---|---|
| Lens | Initial Abs | Final Abs. | In-Band % T | Out-of-Band % T | In-Band % T | Out-of-Band % T |
| ZnTPTP-1 | 0.1403 | 0.0107 | 79.6 | 89.3 | 86.7 | 88.2 |
| ZnTPTP-2 | 0.1002 | 0.0170 | 77.8 | 90.2 | 84.8 | 88.4 |
| ZnTPTP-3 | 0.1107 | 0.0273 | 794 | 88.1 | 89.7 | 95.7 |
| ZnTPTP-4 | 0.1475 | 0.0306 | 79.3 | 87.5 | 86.0 | 86.7 |
| ZnTPTP-5 | 0.1037 | 0.0306 | 78.3 | 86.1 | 92.8 | 95.8 |
| ZnTPTP Av. | | | 78.9 | 88.2 | 88.0 | 91.0 |

TABLE 13

Ethanol Extraction data for TCPP Comprising Contact Lenses

| Lens | EtOH Extration | | Before EtOH Extraction | | After EtOH Extraction | |
|---|---|---|---|---|---|---|
| | Initial Abs | Final Abs. | In-Band % T | Out-of-Band % T | In-Band % T | Out-of-Band % T |
| TCPP-1 | 0.1518 | 0.0195 | 76.7 | 87.1 | 91.3 | 92.7 |
| TCPP-2 | 0.1814 | 0.0088 | 79.5 | 93.8 | 90.3 | 89.7 |
| TCPP-3 | 0.1562 | 0.0179 | 79.4 | 91.4 | 92.9 | 94.4 |
| TCPP-4 | 0.1863 | 0.0190 | 73.7 | 87.8 | 90.7 | 92.3 |
| TCPP-5 | 0.2017 | 0.0368 | 74.1 | 89.1 | 88.5 | 91.3 |
| TCPP Av. | | | 76.7 | 89.8 | 90.7 | 92.1 |

TABLE 14

Ethanol Extraction data for MgTPP Comprising Contact Lenses

| Lens | EtOH Extration | | Before EtOH Extraction | | After EtOH Extraction | |
|---|---|---|---|---|---|---|
| | Initial Abs | Final Abs. | In-Band % T | Out-of-Band % T | In-Band % T | Out-of-Band % T |
| MgTPP-1 | 0.1332 | 0.0200 | 78.8 | 89.3 | 89.0 | 89.6 |
| MgTPP-2 | 0.1463 | 0.0117 | 75.9 | 88.0 | 90.2 | 89.8 |
| MgTPP-3 | 0.1311 | 0.0151 | 78.5 | 89.1 | 91.2 | 94.1 |
| MgTPP-4 | 0.1197 | 0.0150 | 81.9 | 91.0 | 86.1 | 85.1 |
| MgTPP-5 | 0.0742 | 0.0215 | 75.3 | 81.8 | 88.5 | 90.6 |
| MgTPP Av. | | | 78.1 | 87.8 | 89.0 | 89.2 |

Example 5 Discussion

UV-Vis Measurements of Dye Solutions in THF

The absorbance spectra of the different blue light filtering dyes each have different peak widths, and peak positions. The peak position is given by the wavelength with maximum absorbance, and helps to determine where the dye absorbs light within the blue light region. As the peak positions of the dyes may change slightly when the dyes are fabricated into contact lenses, a peak position, for example proximal to the center of the blue light region may be suitable for blue light filtration. This may also help to prevent unnecessary tinting, as absorbance outside the blue light region may add tint to the lenses without increasing the amount of blue light that is filtered. The peak width, given by its full width at half maximum, correlates with how much of the blue light region is covered. Tabulated data for each of the dyes is shown below in Table 15.

TABLE 15

Comparison of dye concentration, absorbance maximum (uncorrected), molar extinction coefficient, peak position ($\lambda_{max}$) and peak width (FWHM) in THF solutions

| Dye | Concentration (mol/L) | Absorbance Maximum | $\epsilon$ (L/molcm) | $\lambda_{max}$ (nm) | FWHM (nm) |
|---|---|---|---|---|---|
| ZnTPP | $1.5 \times 10^{-6}$ | 0.9417 | $6.8 \times 10^{-6}$ | 423 | 8 |
| ZnTPTP | $1.4 \times 10^{-6}$ | 0.9389 | $7.3 \times 10^{-6}$ | 424 | 8 |
| TCPP | $1.3 \times 10^{-6}$ | 0.2552 | $7.9 \times 10^{-6}$ | 418 | 14 |
| TNPP | $1.3 \times 10^{-6}$ | 0.1227 | $7.9 \times 10^{-6}$ | 423 | 20 |
| TPyP | $1.7 \times 10^{-6}$ | 0.4682 | $6.2 \times 10^{-6}$ | 415 | 13 |
| MgTPP | $2.0 \times 10^{-6}$ | 1.2698 | $6.6 \times 10^{-6}$ | 429 | 8 |
| Perylene | $3.8 \times 10^{-6}$ | 0.4066 | $2.5 \times 10^{-6}$ | 437 (410) | 38 |

*perylene has two absorbance peaks overlapping with the blue light region, second peak given in brackets.

From the calculated molar extinction coefficients, all of the porphyrin dyes have similar values ranging from approximately $6.2 \times 10^5$ to $7.9 \times 10^5$ L mol$^{-1}$ cm$^{-1}$. A larger extinction coefficient would lead to less dye needing to be incorporated into the composite particles. In comparing the peak widths using the FWHM, the metallated porphyrins (ZnTPP, ZnTPTP, MgTPP) have narrower peaks, while the un-metallated, free-base porphyrins (TPTP, TCPP, TNPP, TPyP) have more broad absorbance peaks.

Measurement of Lenses with In-Band Transmission of 75%

The selected lenses for the different dyes had average in-band transmission values ranging from 75.1 to 79.6. This represents a reasonably small spread of transmission values. The out-of-band transmission for the lenses was slightly lower than expected, and had a range of 85.9 to 90.0.

The central lens thickness measurements showed that the lenses generally fell within the expected range of 70-100 µm.

Ethanol Extraction

In the ethanol extraction experiments, the different blue light filtering dyes performed relatively similarly, in that all demonstrated significant leaching upon exposure to ethanol. The results for each dye are re-summarized below in Table 16. It is important to note that although the lenses exhibited sufficient blue light blocking ability before the ethanol extraction (~75% transmittance), the ethanol extraction removed the dye to the point that the lenses could no longer be considered blue light blocking.

The final In-Band transmission measurements were very similar to the final Out-Band transmission measurements, further indicating that the dyes were not retained and the blue light blocking characteristics destroyed. These dyes are not capable of surviving this manufacturing process, and thus are not suitable for use as blue light blocking additives in contact lenses.

TABLE 16

In-Band and Out-of-Band Measure measurements After Ethanol Extraction

| Dye | Average In-Band | Average Out-Band |
|---|---|---|
| ZnTPP | 89.5 | 91.8 |
| ZnTPTP | 88.0 | 91.0 |
| TCPP | 90.7 | 92.1 |
| MgTPP | 89.0 | 89.2 |

Summary

A number of different dyes were compared as blue light filters for hydrogel contact lenses. Porphyrin dyes were found to give narrow absorption peaks, which helps reduce the level of tint in the contact lenses. Metallated porphyrins tended to have narrower absorbance peaks than un-metallated free-base porphyrins. Four dyes, ZnTPP, ZnTPTP, TCPP, and MgTPP, were selected for further study as these dyes are of the porphyrin class and showed preliminarily promising absorbance profiles.

The primary metric of comparison is performance against the ethanol extraction step of contact lens manufacturing. It is known that resistance to ethanol extraction is an indicator of a dye's suitability for blue light filtering in contact lenses. The dyes assessed here demonstrated nearly full extraction in this process, indicating that these dyes are not suitable in blue light filtering contact lens additives.

In contrast, as shown in Examples 1 to 3, composite particles comprising TPTP withstood ethanol extraction when formulated into a contact lens.

Example 6 General Procedure for Preparing Silicon Hydrogel Contact Lenses

The monomers were kept refrigerated at 4° C. An exemplary monomer composition comprises 1300 mg of macromer, 1300 mg of TRIS, and 1300 mg of DMA. One or more composite particles of the present disclosure are added to the monomer solution. The initiator can be added to the monomer solution before or after the composite particles are added. The base formulation was equal parts of these monomers and used to calculate ratios of other components. Equal weights of EGDMA and PEG200DMA were added to a desired concentration anywhere between 0 and 10 wt % of the base formulation, imprinting monomers were then added between 0 and 10 wt % of the base formulation. Darocur 1173 was added to the solution to a concentration of 1% of the base formulation. The samples were thoroughly mixed by sonication for 30 min. The formulations were exposed to high shear mixing for up to 1 min and sonicated for at least 15 min to remove any dissolved air or air bubbles.

A fixed volume was pipetted into polypropylene (PP) lens molds. The mass of formulation pipetted varied between 100 and 200 mg. The lens was polymerized via UV polymerization using a UV light source with an intensity of approximately 25 mW/cm$^2$ for a duration of 1.5 min. Out of mold lenses were ~220 mm thick (center thickness) and water swollen lenses were ~350 mm thick (center thickness) unless otherwise noted. Thinner lenses were produced with a swollen center thickness of ~100 mm using a Thomas spherical joint pinch clamp tightened around the mold. The lenses were then removed from the mold.

While the present disclosure has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present disclosure is found to be defined differently in a document incorporated herein by reference, the definition provided herein is to serve as the definition for the term.

The invention claimed is:

1. A composite particle comprising:
   5,10,15,20-(tetra-p-tolyl)porphyrin (TPTP); and
   an amphiphilic block copolymer encapsulating the TPTP.
2. The composite particle of claim 1, wherein the amphiphilic block copolymer is a diblock or triblock copolymer, optionally a diblock copolymer.
3. The composite particle of claim 1, wherein the amphiphilic block copolymer is terminally functionalized, optionally, the amphiphilic block copolymer is acrylate-terminated, alkylacrylate-terminated, methacrylate-terminated, alkyl methacrylate-terminated, or combinations thereof.
4. The composite particle of claim 1, wherein the number average molecular weight ($M_n$) of each block of the amphiphilic block copolymer is independently from about 250 to about 100000, from about 1300 to about 31500, or from 5000 to about 10000.
5. The composite particle of claim 1, wherein the amphiphilic block copolymer is poly(dimethylsiloxane)-b-poly(acrylic acid).
6. The composite particle of claim 1, wherein the amphiphilic block copolymer encapsulates the dye in a micelle formation.
7. The composite particle of claim 1, wherein the composite particle comprises about 0.01% w/w to about 90% w/w of TPTP.
8. The composite particle of claim 1 comprising
   TPTP; and
   poly(dimethylsiloxane)$_{8000}$-b-poly(acrylic acid)$_{8000}$.
9. The composite particle of claim 8 comprising
   about 7% w/w to about 13% w/w of TPTP; and
   about 87% w/w to about 93% w/w poly(dimethylsiloxane)$_{8000}$-b-poly(acrylic acid)$_{8000}$.
10. A composition comprising one or more composite particles as defined in claim 1 in a solvent selected from aqueous solvent, organic solvent, and combinations thereof.
11. The composition of claim 10 further comprising polyethylene glycol.
12. A contact lens monomer composition comprising
    one or more composite particles as defined in claim 1;
    a polymerizable monomer; and
    a catalyst suitable for initiating polymerization of the polymerizable monomer.
13. The contact lens monomer composition of claim 12, wherein the polymerizable monomer comprises methacrylate-based monomer or silicon-based monomer.
14. A contact lens comprising one or more composite particles as defined in claim 1.
15. A contact lens obtained by polymerizing a contact lens monomer composition as defined in claim 10.
16. The contact lens of claim 14, wherein the contact lens is stable to incubation in ethanol.
17. Method of performing optical filtration comprising providing a composite particle as defined in claim 1 and using the composite particle as an optional filter.
18. Method of selectively blocking blue light comprising providing a composite particle as defined in claim 1 and using the composite particle as an optional filter.
19. The use method of claim 17, wherein the composite particle is used as an optical filter in a contact lens, optionally a hydrogel-based or a silicone hydrogel-based contact lens.
20. Method of preparing a contact lens comprising
    preparing a contact lens monomer composition by mixing a composite particle as defined in claim 1 with a polymerisable monomer, and a catalyst suitable for initiating polymerization of the polymerisable monomer; and
    polymerizing the contact lens monomer solution.

* * * * *